United States Patent
Gorodisher et al.

(10) Patent No.: US 9,896,599 B2
(45) Date of Patent: Feb. 20, 2018

(54) PROCESS FOR PREPARING POLY(BENZOXAZINES)

(71) Applicant: 3M INNOVATIVE PROPERTIES COMPANY, St. Paul, MN (US)

(72) Inventors: Ilya Gorodisher, Stillwater, MN (US); George W. Griesgraber, Eagan, MN (US); Guy D. Joly, Shoreview, MN (US); Dmitriy Salnikov, Woodbury, MN (US); Robert J. Webb, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 185 days.

(21) Appl. No.: 14/776,087

(22) PCT Filed: Apr. 22, 2014

(86) PCT No.: PCT/US2014/034863
§ 371 (c)(1),
(2) Date: Sep. 14, 2015

(87) PCT Pub. No.: WO2014/179100
PCT Pub. Date: Nov. 6, 2014

(65) Prior Publication Data
US 2016/0040037 A1    Feb. 11, 2016

Related U.S. Application Data

(60) Provisional application No. 61/817,344, filed on Apr. 30, 2013.

(51) Int. Cl.
C08G 67/02 (2006.01)
C09D 179/04 (2006.01)
(Continued)

(52) U.S. Cl.
CPC ....... C09D 179/04 (2013.01); C08G 73/0233 (2013.01); C08K 5/0025 (2013.01);
(Continued)

(58) Field of Classification Search
CPC .... C09D 179/04; C08G 73/0233; C08L 79/02
(Continued)

(56) References Cited

U.S. PATENT DOCUMENTS 3,018,262 A    1/1962    Schroeder
3,298,998 A    1/1967    McConnell
(Continued)

FOREIGN PATENT DOCUMENTS

CA    1300307    5/1992
EP    2314579    4/2011
(Continued)

OTHER PUBLICATIONS

Baqar, "Mechanistic Pathways for the Polymerization of Methylol-Functional Benzoxazine Monomers", Macromolecules, 2012, vol. 45, pp. 8119-8125.
(Continued)

*Primary Examiner* — Jane L Stanley
(74) *Attorney, Agent, or Firm* — Kent S. Kokko

(57) ABSTRACT

A polymerizable composition is described comprising a benzoxazine, and a tosylate, which when thermolyzed, forms a (meth)acrylamide, a (meth)acrylate, a vinyl ketone, a vinyl ether or a styrenic compound.

13 Claims, 4 Drawing Sheets

(51) Int. Cl.
*C08K 5/00* (2006.01)
*C08G 73/02* (2006.01)
*C08K 5/42* (2006.01)
*C09J 179/04* (2006.01)
*C08L 79/04* (2006.01)

(52) U.S. Cl.
CPC ............... *C08K 5/42* (2013.01); *C08L 79/04* (2013.01); *C09J 179/04* (2013.01)

(58) Field of Classification Search
USPC ........................................................ 524/612
See application file for complete search history.

(56) References Cited

U.S. PATENT DOCUMENTS

| | | | |
|---|---|---|---|
| 3,496,250 | A | 2/1970 | Czerwinski |
| 4,868,288 | A | 9/1989 | Meier |
| 5,059,701 | A | 10/1991 | Keipert |
| 5,073,476 | A | 12/1991 | Meier |
| 5,089,536 | A | 2/1992 | Palazzotto |
| 5,191,101 | A | 3/1993 | Palazzotto |
| 5,543,516 | A | 8/1996 | Ishida |
| 5,554,664 | A | 9/1996 | Lamanna |
| 6,207,786 | B1 | 3/2001 | Ishida |
| 6,225,440 | B1 | 5/2001 | Ishida |
| 6,376,080 | B1 | 4/2002 | Gallo |
| 6,620,905 | B1 | 9/2003 | Musa |
| 6,743,852 | B2 | 6/2004 | Dershem |
| 7,041,772 | B2 | 5/2006 | Aizawa |
| 7,053,138 | B2 | 5/2006 | Magendie |
| 7,517,925 | B2 | 4/2009 | Dershem |
| 8,389,758 | B2 | 3/2013 | Gorodisher |
| 2010/0144964 | A1* | 6/2010 | Sudo ................. C08F 10/00 524/612 |
| 2010/0307680 | A1 | 12/2010 | Gorodisher |
| 2010/0312004 | A1 | 12/2010 | Gorodisher |
| 2012/0301662 | A1* | 11/2012 | Yamashita ......... C08G 59/4014 428/114 |

FOREIGN PATENT DOCUMENTS

| | | | |
|---|---|---|---|
| JP | 63-93748 | 4/1988 | |
| WO | WO 2002-00757 | 1/2002 | |
| WO | WO 2003-072638 | 9/2003 | |
| WO | WO 2010-141397 | 12/2010 | |
| WO | WO 2011-047939 | 4/2011 | |
| WO | WO 2011047939 A1 * | 4/2011 | ............... C08K 5/42 |
| WO | WO 2012-018753 | 2/2012 | |
| WO | WO 2012-134731 | 10/2012 | |
| WO | WO 2012-135180 | 10/2012 | |
| WO | WO 2013-048851 | 4/2013 | |
| WO | WO 2014-052255 | 4/2014 | |
| WO | WO 2014-105422 | 7/2014 | |

OTHER PUBLICATIONS

Gamlin, "Mechanism and kinetics of the isothermal thermodegradation of ethylene-propylene-diene (EPDM) elastomers", Polymer Degradation and Stability, 2003, vol. 80, pp. 525-531.
Ghosh, "Polybenzoxazine-New high performance thermosetting resins: Synthesis and properties", Progress in Polymer Science, 2007, vol. 32, pp. 1344-1391.
Kimura, "New Thermosetting Resin from Bisphenol A-Based Benzoxazine and Bisoxazoline", Journal of Applied Polymer Science, 1999, vol. 72, pp. 1551-1558.
Lee, "Regiospecific Synthesis of 3-Organosulfonyloxy-2-alkanones", Tetrahedron Letters, 1998, vol. 39, pp. 3171-3172.
Rimdusit, "Development of new class of electronic packaging materials based on ternary systems of benzoxazine, epoxy, and phenolic resins", Polymer, 2000, vol. 41, pp. 7941-7949.
Schalley, "Analysis and Improvement of an Anion-Templated Rotaxane Synthesis", Helvetica Chimca Acta, 2002, vol. 85, pp. 1578-1596.
Sudo, "Ring-Opening Polymerization of 1,3-Benzoxazines by p-Toluenesulfonates as Thermally Latent initiators", Journal of Polymer Science Part A:Polymer Chemistry, 2011, vol. 49, pp. 3631-3636.
International Search Report for PCT International Application No. PCT/US2014/034863 dated Jul. 14, 2014, 3 pages.
Nash, et al., "Pyrolysis of Aryl Sulfonate Esters in the Absence of Solvent: E1 or E2? A Puzzle for the Organic Laboratory," Journal of Chemical Education, Vo. 85, No. 4, Apr. 4, 2008, pp. 552-554.

* cited by examiner

US 9,896,599 B2

PROCESS FOR PREPARING POLY(BENZOXAZINES)

CROSS REFERENCE TO RELATED APPLICATIONS

This application is a national stage filing under 35 U.S.C. 371 of PCT/US2014/034863, filed Apr. 22, 2014, which claims priority to U.S. Application No. 61/817,344, filed Apr. 30, 2013, the disclosure of which is incorporated by reference in its/their entirety herein.

FIELD OF THE INVENTION

A process of preparing polybenzoxazines using a functional alkylating agent is described.

BACKGROUND

Benzoxazines and compositions containing benzoxazine are known (see, for example, U.S. Pat. Nos. 5,543,516 and 6,207,786 to Ishida et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura et al., "New Thermosetting Resin from Bisphenol A-based Benzoxazine and Bisoxazoline", J. App. Polym. Sci., 72, 1551-58 (1999).

U.S. Pat. No. 7,517,925 (Dershem et al.) describes benzoxazine compounds and thermosetting resin compositions prepared therefrom. The compositions are said to be useful for increasing adhesion at interfaces within microelectronic packages and low shrinkage on cure and low coefficient of thermal expansion (CTE).

U.S. Pat. No. 7,053,138 (Magendie et al.) describes compositions comprising benzoxazines and thermoplastic or thermoset resins in the manufacture of prepregs and laminates. The compositions are said to yield flame-proofed laminating resins that have high glass transition temperatures.

U.S. Pat. No. 6,376,080 (Gallo) describes a method of preparing a polybenzoxazine which includes heating a molding composition including a benzoxazine and a heterocyclic dicarboxylic acid to a temperature sufficient to cure the molding composition, thereby forming the polybenzoxazine. The compositions are said to have near-zero volume change after post cure.

U.S. Pat. No. 6,207,786 (Ishida et al.) states that the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. FTIR (Fourier transform infrared) analysis is often used to monitor the conversion of the oxazine rings to polymers to provide an estimate of the rate of polymerization at different temperatures. NMR (nuclear magnetic resonance) spectroscopy can also be used to monitor conversion of benzoxazine monomers to polymer.

Epoxy adhesives have been widely used in structural adhesive applications and satisfy many demanding industrial applications. However epoxies have many noted deficiencies that limit their use including limited high temperature stability, high moisture uptake, shrinkage, and a large exotherm on polymerization.

Polybenzoxazines have been proposed to overcome many of the limitations on epoxies. They have lower exotherms on curing, less shrinkage, have higher thermal stability, low byproducts and may be readily prepared from benzoxazines, which in turn, are readily prepared from an amine, formaldehyde and a phenol in high yields. However, current methods of preparing polybenzoxazines require relatively high temperatures, and typically produce brittle, highly crosslinked polymers.

Efforts to reduce the polymerization temperature have included the addition of various phenols or Lewis acid accelerators, or copolymerization of the benzoxazine with epoxides or other monomers such as phenol-formaldehyde. However the resultant polybenzoxazines-epoxy hybrids retain many of the limitations of the epoxies, and compromise many desirable features thereof, such as epoxy toughness.

The present disclosure is directed to a curable composition comprising a benzoxazine compound and a functional alkylating agent. The curable composition may be cured to produce cured compositions useful in coating, sealants, adhesive and many other applications. The present disclosure further provides a curable composition comprising a benzoxazine compound and a functional alkylating agent, which when cured, is useful in high temperature structural adhesive applications. The present disclosure further provides a method of preparing a polybenzoxazine comprising heating the curable composition at a temperature, and for a time sufficient, to effect polymerization.

In one embodiment, the present disclosure provides a polymerizable composition including: a benzoxazine; an alkylating agent; and a film-forming material, a co-catalyst, a curative, or a combination thereof. In certain embodiments, a polymerizable composition can further include a toughener (i.e., toughening agent), an epoxy resin, a reactive diluent, or combinations thereof.

The present disclosure overcomes many of the deficiencies noted for the polymerization of polybenzoxazines including lower polymerization temperatures and reduced exotherms. In some embodiments, the product polybenzoxazines are flexible solids having good thermal stability, and are useful for many industrial applications.

As used herein, the term "benzoxazine" is inclusive of compounds and polymers having the characteristic benzoxazine ring. In the illustrated benzoxazine group, R is the residue of a mono- or poly-aromatic amine.

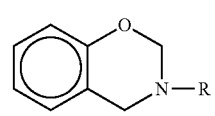

I

As used herein "polybenzoxazine" refers to a compound having two or more benzoxazine rings.

As used herein "poly(benzoxazine)" refers to the polymer resulting from ring-opening polymerization of benzoxazine or polybenzoxazine compounds.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to, methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of (hetero)hydrocarbyl alkyl and aryl groups, and hetero(hetero)hydrocarbyl heteroalkyl and heteroaryl groups, the later comprising one or more catenary oxygen heteroatoms such as ether or amino groups. Hetero(hetero)hydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero) hydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl" and "heteroaryl" supra.

As used herein, the term "residue" is used to define the (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of phenylene diamine $H_2N$—$C_6H_4$—$NH_2$, is the divalent aryl —$C_6H_4$—.

DETAILED DESCRIPTION

Figure 1:
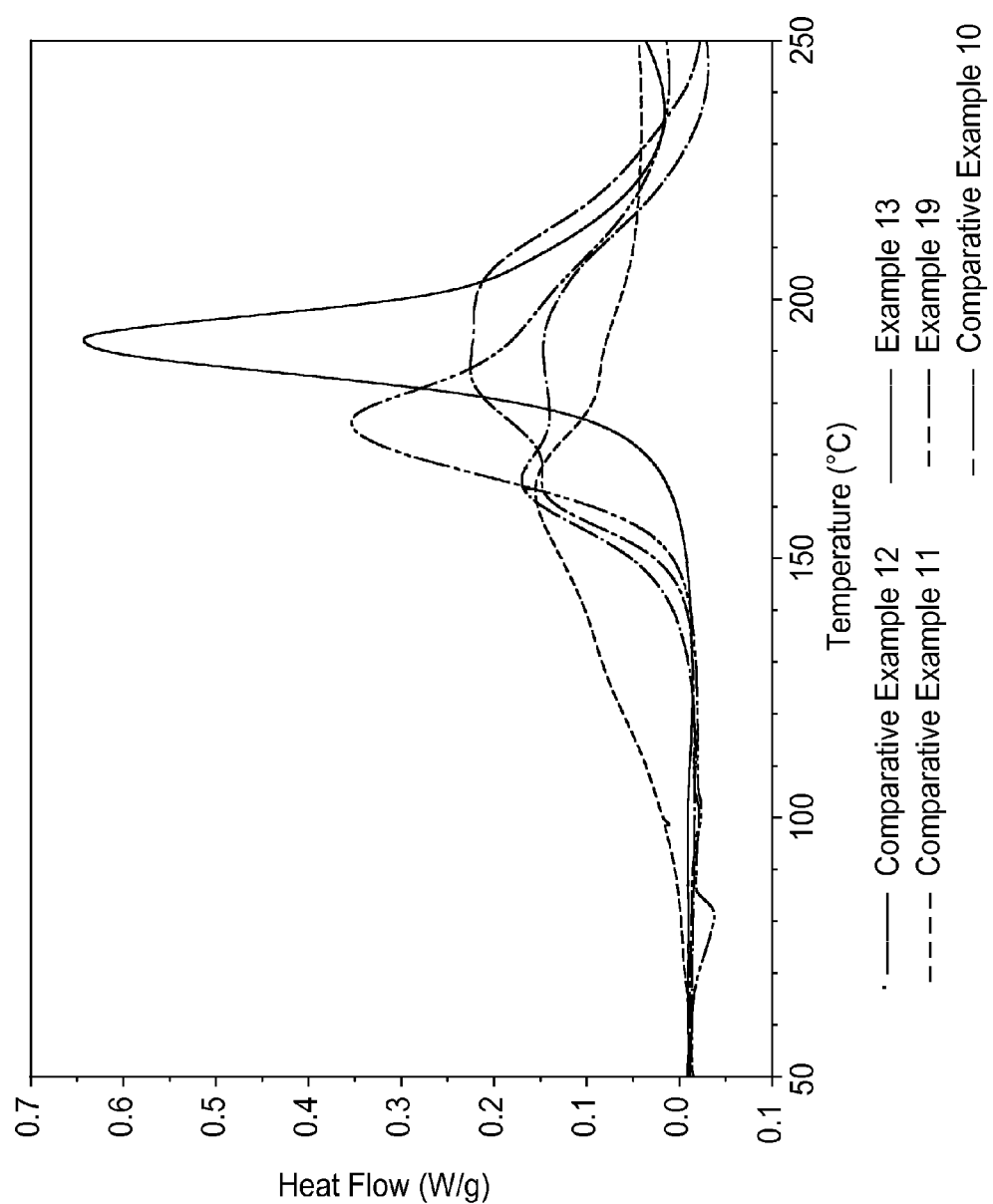
FIG. 1 is a DMA scan of Comparative Examples 10, 11 and 12, and Examples 13 and 19.

The present disclosure provides a method of preparing poly(benzoxazine) polymers by combining a benzoxazine compound and a functional alkylating agent, specifically a toluenesulfonyl compound (tosylate), which when thermolyzed, forms a (meth)acrylamide, a (meth)acrylate, a vinyl ketone, a vinyl ether or a styrenic compound. Unlike acid-catalyzed polymerization of benzoxazines, the alkylating agent is incorporated into the poly(benzoxazine).

In the preparation of the polybenzoxazine, any benzoxazine compound derived from an aromatic amine may be used. Benzoxazines may be prepared by combining a phenolic compound, and aliphatic aldehyde, and a primary aromatic amine compound, such as aniline. U.S. Pat. No. 5,543,516 (Ishida) and U.S. Pat. No. 7,041,772 (Aizawa et al.) hereby incorporated by reference, describe methods of forming benzoxazines. Other suitable reaction schemes to produce mono-, di- and higher-functional benzoxazines are described in N. N. Ghosh et al., *Polybenzoxazine-new high performance thermosetting resins: synthesis and properties*, Prog. Polym. Sci. 32 (2007), pp. 1344-1391.

One suitable method of producing the starting benzoxazine compounds is illustrated by the following reaction scheme:

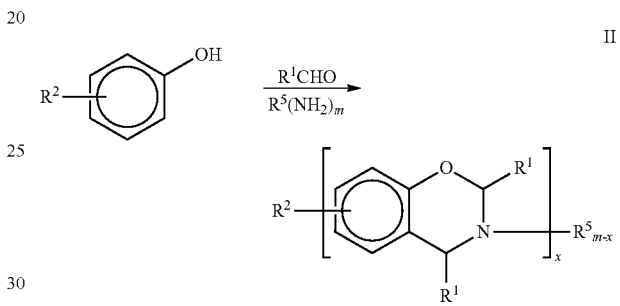

wherein
each $R^1$ is H or an alkyl group, and is the residue of an aliphatic aldehyde,
$R^2$ is H, a covalent bond, a phenol or a polyvalent (hetero) hydrocarbyl group, preferably H, a covalent bond or a divalent alkyl group;
$R^5$ is aryl residue of a primary amino compound, $R^5(NH_2)_m$, where $R^5$ is an aryl group, m is 1-4; and x is at least 1. It will be appreciated that as the $R^2$ group may be part of a polyphenolic compound, said $R^2$ group may bond to another benzoxazine ring as illustrated in Formula IV below. Similarly, as the $R^5$ may be derived from a polyamine, the $R^5$ may also be bonded to another benzoxazine ring as illustrated in Formula III below.

In the preparation of the starting benzoxazine, mono- or polyphenolic compounds may be used. The phenolic compound may be further substituted without limitation is desired. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allylphenol; 4-aminophenol; and the like. Examples of difunctional phenols (polyphenolic compounds) include phenolphthalein; biphenol; 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol; fluorene bisphenol; and the like. Examples of trifunctional phenols comprise 1,3,5-trihydroxy benzene and the like.

The aldehyde reactants used in preparing the benzoxazine starting materials include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted aromatic amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl.

Amines useful in the preparation of the starting benzoxazine compounds include those of the formula $R^5(NH_2)_m$ include aryl monoamines and polyamines. $R^5$ is an aryl group that has a valence of m, and is the residue of a mono-, di- or higher aromatic amine having at least one primary amine group. Subscript m is 1 to 4.

Examples of useful aromatic amines include aniline, o-, m- or p-toluidine, 2,6-dimethyl aniline, 2,5-dimethyl aniline p-bromoaniline, 3,5-dimethyl aniline and 2,4-dimethyl aniline, p-nitroaniline, di-(4-aminophenyl)sulfone, di-(4-aminophenyl)ether, 2,2-bis(4-aminophenyl)propane, 4,4'-diamino diphenylmethane, 3,3'-dimethyl(4,4'-diaminodiphenyl methane, m- or p-phenylene diamine, m-xylylene diamine, toluene diamine, 4,4'methylene dianiline benzidine, 4,4'-thiodianiline, 4-methoxy-1,3-phenyldiamine, 2,6-diaminopyridine, and dianisidine.

It will be understood that monoamines will cyclize with the aldehyde and phenolic compound to produce monobenzoxazine compounds, while di- or higher amines will cyclize to produce di- and poly-benzoxazine compounds: For example, a diamine (m=2 in the Scheme III below) will produce a di-benzoxazine.

III

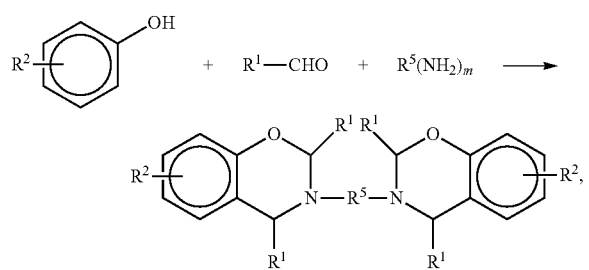

wherein each $R^1$ is H or an alkyl group, and is the residue of an aliphatic aldehyde;

$R^2$ is H, a covalent bond, or a polyvalent (hetero)hydrocarbyl group, preferably H, a covalent bond or a divalent alkyl group;

$R^5$ is the aryl residue of a primary amino compound.

Further, polymeric benzoxazines may be prepared from a polyphenolic compounds, such as bisphenol-A, and a di- or polyamine, which may be further ring-opening polymerized as shown in Formula IV:

IV

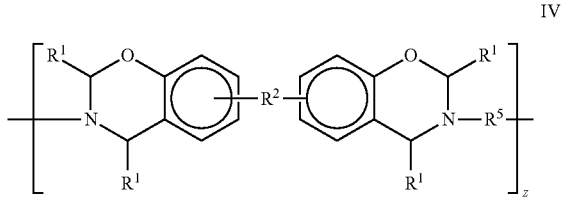

wherein each $R^1$ is H or an alkyl group, and is the residue of an aliphatic aldehyde, $R^2$ is H, a covalent bond, or a polyvalent (hetero)hydrocarbyl group, preferably H, a covalent bond or a divalent alkyl group;

$R^4$ is the (hetero)hydrocarbyl residue of a primary amino compound;

$R^5$ is the aryl residue of a primary amino compound;

z is at least 1, preferably 2 or greater.

The alkylating agent is a tosylate compound, which when thermolyzed in the absence of the benzoxazine, produces an ethylenically unsaturated monomer unit, capable of free radically polymerization. Surprisingly, it has been determined that the compound alkylates the benzoxazine nitrogen and catalyzes the ring-opening polymerization of the benzoxazine, in contrast to the known mechanism of acid-catalyzed polymerization. No evidence of free radical polymerization of the incipient monomer is observed. The alkylating agent, when thermolyzed, produces a (meth) acrylamide, a (meth)acrylate, a vinyl ketone, a vinyl ether or a styrenic compound.

In one embodiment the functional alkylating agent is an α- or β-tosylate carbonyl compound of the following formula. When thermolysed in the absence of the benzoxazine, compounds IV can produce vinyl ketones, (meth)acrylates and vinyl ketones, respectively.

V

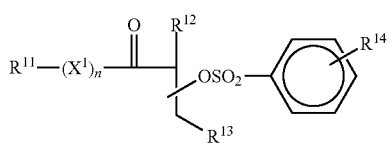

wherein $R^{11}$ is an alkyl or aryl or combination thereof;

$X^1$ is —O— or —NR$^{15}$— where $R^{15}$ is H or $C_1$-$C_4$ alkyl n is 0 or 1;

$R^{12}$ is H or an alkyl;

$R^{13}$ is H or an alkyl;

$R^{14}$ is H or an alkyl.

More specifically the tosylate may be of the formula:

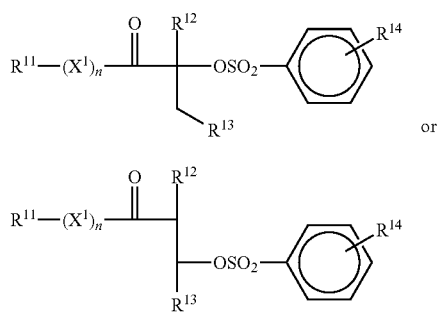
VI or

VII

In another embodiment, the alkylating agent is an α- or β-tosylate, which when thermolyzed, produces a styrenic compound. Such compounds are tosylates of 1-, or 2-hydroxyalkyl phenyl compounds of the formula:

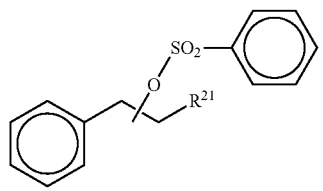
VIII where $R^{21}$ is H or $C_1$-$C_4$ alkyl.

In another embodiment, the alkylating agent is a tosylate compound, which when thermolyzed produces a vinyl ether. Such compounds are generally the mono- or di-tosylates of ethylene glycols:

$$R^{22}OCH_2CH_2-(OCH_2CH_2)_w-OCH_2CH_2OTs,$$  IX where
$R^{22}$ is H, $C_1$-$C_{10}$ alkyl, or a tosylate;
w is 0 to 10, and
OTs is a tosylate group. In embodiments where $R^{22}$ is a tosylate group, and w is 0, thermolysis would yield a divinyl ether of the formula:

$$CH_2=CH-O-CH=CH_2.$$

In embodiments where $R^{22}$ is an alkyl group, and w is 0, thermolysis would yield a vinyl ether of the formula:

$$R^{22}O-CH_2CH_2-O-CH=CH_2$$

It is believed that polymerization is initiated by N-alkylation of the benzoxazine nitrogen which ring-opens the benzoxazine ring to linear or branched polymers.

Acid-catalyzed polymerization is reported to yield poly(benzoxazines) having the following generic phenolic and/or phenoxy repeat units. See U.S. Pat. No. 6,625,440 (Ishida et al).

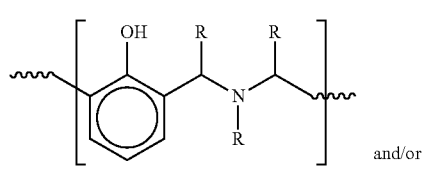
VIII and/or

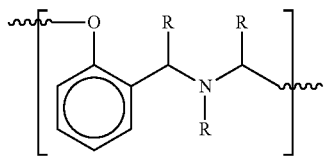
IX

Unlike the repeat units previously reported, Applicants have discovered incorporation of the alkylating agent into the resultant polymer, resulting in a polybenzoxazine formed from Friedel-Crafts alkylation of intermediate ring-opened products. In particular, the product reveals N-alkylated aryl amine units. Such units may be represented by the formula:

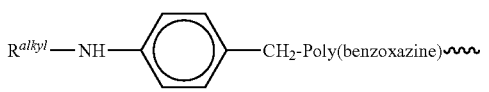
Xa and/or

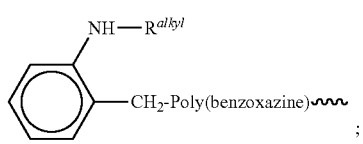
Xb where $R^{alkyl}$ is the residue of the tosylate compound. With reference to the compounds of formulas VI, $R^{alkyl}$ may be represented as:

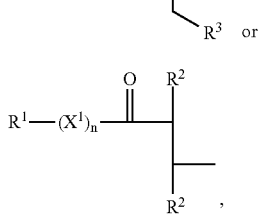
XI or

XII

Similarly, if the alkylating agent is selected from phenyl compounds of Formula VIII, $R^{alkyl}$ may be represented as

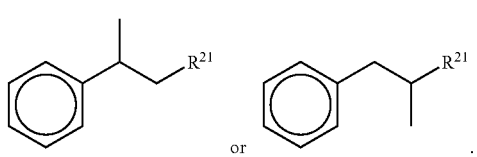

The ethylene glycol tosylates of Formula IX would yield $R^{alkyl}$ groups of the formula:

$$R^{22}-OCH_2CH_2-(OCH_2CH_2)_w-OCH_2CH_2-$$

It will be appreciated that bis-tosylates, where $R^{22}$ is a tosylate group may crosslink the poly(benzoxazine by forming a second $R^{alkyl}$ group.

The "poly(benzoxazine)" comprises one or more of the following repeat units and generally all of the following repeat units, in addition to the N-alkylated units of Formula Xa,b:

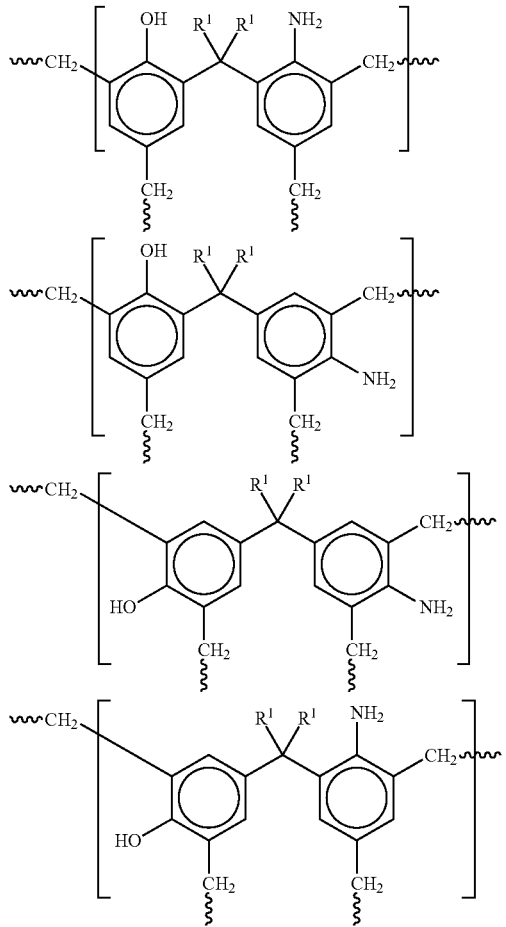

where each $R^1$ is independently $R^1$ is H or an alkyl group, and
the "~" represents attachment to another repeat unit. NMR generally reveals the presence of each of these repeat units in the polymer.

Due to the reaction mechanism discovered by Applicants, it is believed that the dialkyl-substituted methylenes (two $R^1$ groups are alkyl) will stabilize the carbocation intermediate.

The amount of N-alkylated units of Formula Xa and Xb is a function of the amount of tosylate alkylating agent in the curable composition. The tosylate compounds of Formulas V-VII are used in amounts of 0.05 to 10 parts by weight, relative to 100 parts by weight of the benzoxazine. It will be appreciated that the resultant poly(benzoxazine) will further comprise a tosylate residue of the alkylating agent.

In some embodiments the curable benzoxazine composition may comprise a co-catalyst. Suitable co-catalysts include those selected from the group of elemental sulfur, elemental selenium, a sulfide of a Group VA element (e.g., N, P, As, Sb, Bi) of the Periodic Table (referring to the older CAS or American group numbering system), a sulfide of a Group VIA element (e.g., O, S, Se, Te, Po), a selenide of a Group VA element, a selenide of a Group VIA element, and a combination thereof.

Desirably, the melting point of the selected added co-catalyst is lower than the thermal self-catalysis temperature of the benzoxazine employed.

Crystalline or amorphous forms of elemental sulfur may be used as a co-catalyst. Elemental sulfur is nominally described as a $S_8$ ring, although other polymers and oligomers are known. Various allotropic forms of elemental selenium may be used. Nominally, selenium sulfide refers to many different compounds of sulfur and selenium, but is generally given by the formula $SeS_2$. Phosphorus sesquisulfide, phosphorus pentasulfide, and tetrasulfur tetranitride can be used.

Other suitable co-catalysts are salts of an organometallic complex cation. Such compounds include cations that have at least one carbon atom bonded to a transition metal atom.

In certain embodiments of polymerizable compositions of the disclosure, the organometallic complex salt of the polymerizable compositions of the present disclosure is represented by the following formula:

wherein in Formula (XX):
M is selected from the group Cr, Ni, Mo, W, Mn, Tc, Re, Fe, Ru, Os, Co, Rh, and Ir;
$L^1$ and $L^2$ represent the same or different ligands contributing pi-electrons that can be selected from aromatic compounds and heterocyclic aromatic compounds, and the ligand is capable of contributing six pi-electrons to the valence shell of NT;
q is an integer having a value of 1 or 2, the residual charge of the complex cation;
y and z are integers having a value of 0, 1, or 2, provided that the sum of y and z is equal to 2;
X is a suitable anion (one that does not interfere with the polymerization); and
n is an integer having a value of 1 or 2, the number of complex anions required to neutralize the charge q on the complex cation.

Examples of ligands $L^1$ and $L^2$ in Formula (XX) include substituted an unsubstituted carboxylic and heterocyclic aromatic ligands having up to 25 rings, up to 100 carbon atoms, and up to 10 heteroatoms (selected from N, S, non-peroxidic O, P, As, Se, B, Sb, Te, Si, Ge, Sn), such as, for example, $eta^6$-benzene, $eta^6$-mesitylene, $eta^6$-toluene, $eta^6$-p-xylene, $eta^6$-o-xylene, $eta^6$-m-xylene, $eta^6$-cumene, $eta^6$-durene, $eta^6$-pentamethylbenzene, $eta^6$-hexamethylbenzene, $eta^6$-fluorene, $eta^6$-naphthalene, $eta^6$-anthracene, $eta^6$-perylene, $eta^6$-chrysene, $eta^6$-pyrene, $eta^6$-triphenylmethane, $eta^6$-paracyclophane, $eta^6$-carbazole, $eta^6$-cyclopentadienyl anion, for example, eta5-cyclopentadienyl anion, $eta^6$-methylcyclopentadienyl anion, $eta^5$-pentamethylcyclopentadienyl anion, $eta^6$-trimethylsilylcyclopentadienyl anion, $eta^5$-trimethyltincyclopentadienyl anion, $eta^6$-triphenyltincyclopentadienyl anion, $eta^5$-triphenylsilylcyclopentadienyl anion, and $eta^5$-indenyl anion.

In certain embodiments; $L^2$ in Formula (XX) represents the same or different ligands contributing pi-electrons that can be selected from cyclopentadienyl and indenyl anion groups, and the ligand is capable of contributing six pi-electrons to the valence shell of M.

Each of the ligands $L^1$ and $L^2$ in Formula (XX) can be substituted by groups that do not interfere with the complexing action of the ligand to the metal atom or that do not reduce the solubility of the ligand to the extent that competing with the metal atom does not take place. Examples of substituting groups, all of which typically have less than 30 carbon atoms and up to 10 hetero atoms (selected from N, S, non-peroxidic O, P, Ar, Se, Sb, Te, Si, Ge, Sn, and B), including hydrocarbyl groups such as methyl, ethyl, butyl, dodecyl, tetracosanyl, phenyl, benzyl, allyl, benzylidene, ethenyl, and ethynyl; cyclohydrocarbyl such as cyclohexyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, and cyclohexanecarbonyloxy; hydrocarbylcarbonamido, for example, acetamido, benzamid; azo; boryl; halo, for example, chloro, iodo, bromo, and fluoro; hydroxy; cyano; nitro; nitroso; oxo; dimethylamino; diphenylphosphino; diphenylarsino; diphenylstibine; trimethylgermane; tributyltin; methylseleno; ethyltelluro; and trimethylsiloxy.

Ligands $L^1$ and $L^2$ in Formula (XX) independently can be a unit of a polymer, for example, the phenyl group in polystyrene, or polymethylphenylsiloxane; the carbazole group in polyvinylcarbazole; or the cyclopentadiene group in poly (vinylcyclopentadiene). Polymers having a weight average molecular weight up to 1,000,000 or more can be used.

Suitable anions, X, in Formula (XX), for use as the counterion in the ionic salts of the organometallic complex cation in the co-catalyst are those in which X can be represented by the following formula:

$$DQ_l \quad \text{(XXI)}$$

wherein, in Formula (XI):

D is a metal from Groups IB (e.g., Cu, Ag, Au), IIB (e.g., Zn, Cd, Hg), IIIB (e.g., Sc, Y, La, Ac), IVB (e.g., Ti, Zr, Hf), VB (e.g., V, Nb, Ta), VIB (e.g., Cr, Mo, W), VIIB (e.g., Mn, Tc, Re), and VIIIB (e.g., Fe, Ru, Os, Co, Rh, Ir, Ni, Pd, Pt) or a metal or metalloid from Groups IIIA (e.g., B, Al, Ga, In, Tl), IVA (e.g., C, Si, Ge, Sn, Pb), and VA (e.g., N, P, As, Sb, Bi) of the Periodic Table (referring to the older CAS or American group numbering system).

Q is a halogen atom, hydroxyl group, a substituted or unsubstituted phenyl group, or a substituted or unsubstituted alkyl group; and r is an integer having a value of 1 to 6.

In certain embodiments of Formula (XI), the metal D is copper, zinc, titanium, vanadium, chromium, manganese, iron, cobalt, or nickel and the metalloids preferably are boron, aluminum, antimony, tin, arsenic, and phosphorus. In certain embodiments, the halogen atom, Q, is chlorine or fluorine. Illustrative of suitable anions are $B(phenyl)_4^-$, $B(phenyl)_3(alkyl)^-$, where alkyl can be ethyl, propyl, butyl, hexyl and the like, $BF_4^-$, $PF_6^-$, $AsF_6^-$, $SbF_6^-$, $FeCl_4^-$, $SnCl_5^-$, $SbF_5OH^-$, $AlCl_4^-$, $AlF_6^-$, $GaCl_4^-$, $InF_4^-$, $TiF_6^-$, $ZrF_6^-$, $B(C_6F_5)_4^-$, $B(C_6F_3(CF_3)_2)_4^-$.

Additional suitable anions, X, in Formula (XX), for use as the counterion in the ionic salts of the organometallic complex cations include those in which X is an organic sulfonate. Illustrative of suitable sulfonate-containing anions are $CH_3SO_3^-$, $CF_3SO_3^-$, $C_6H_5SO_3^-$, p-toluenesulfonate, p-chlorobenzenesulfonate and related isomers. Additional suitable anions include tris-(highly fluorinated alkyl) sulfonyl methide, bis-(highly fluorinated alkyl) sulfonyl imide, and tris-(fluorinated aryl) sulfonyl methide, as described in U.S. Pat. No. 5,554,664.

In certain embodiments, the anions, X, in Formula (XX) include an anion selected from tris-(highly fluorinated alkyl) sulfonyl methide, bis-(highly fluorinated alkyl) sulfonyl imide, tris-(fluorinated aryl) sulfonyl methide, tetrakis-(fluorinated aryl) borate, organic sulfonate anions, and halogen-containing complex anions of a metal or metalloid (e.g, $SbF_6^-$, $PF_6^-$).

Exemplary such organometallic salts suitable for use as co-catalysts are described in International Publication No. WO 2002/000757 (Mahoney et al.), as well as U.S. Pat. No. 5,089,536 (Palazzotto), U.S. Pat. No. 5,059,701 (Keipert), and U.S. Pat. No. 5,191,101 (Palazzotto et al.), as well as EP Pub. Nos. 094.914 (Irving et al.). 094,915 (Meier et al.), and 126,712 (Meier et al.). Illustrations of their use are described in the Examples Section.

In some embodiments, the co-catalyst may comprise an acid-forming peroxide catalyst. Desirably the decomposition point of the selected catalyst is lower than the thermal self-catalysis temperature of the benzoxazine employed. In certain embodiments, the acid-forming peroxide catalyst includes a carboxyl group, acetyl group, phthalyl group, sulfonyl group, or a combination thereof. In certain embodiments, the acid-forming peroxide catalyst is selected from the group of a diacyl peroxide, a peroxydicarbonate, a peroxyester, and a combination thereof. Acid-forming peroxide co-catalyst are disclosed in Applicant's copending U.S. Ser. No. 61/746,209, filed 27 Dec. 2012 and incorporated herein by reference.

Various combinations of co-catalysts can be used if desired.

If a co-catalyst is used, it is present in an amount of at least 0.1 wt-%, based on the total weight of the polymerizable composition. If a co-catalyst is used, it is present in an amount of no greater than 10 wt-%, 5 wt-%, or 2 wt-%, based on the total weight of the polymerizable composition.

Curatives

Polymerizable compositions of the disclosure optionally include one or more curatives. Such curatives are selected from the group of a thiol compound, an amine compound, and a combination thereof. In certain embodiments, at least one of the thiol compound and the amine compound is polyfunctional. Such curatives can function as reactive diluents.

Useful such compounds have at least one nucleophilic functional group that ring-opens the benzoxazine. Such compounds are of the generally formula:

$$R^{30}-(ZH)_p \quad \text{(XII)}$$

wherein, in Formula (XII):

$R^{30}$ is a (hetero)hydrocarbyl group;

each Z is independently —S— or —$NR^{31}$, where $R^{31}$ is H or a hydrocarbyl group, including aryl and alkyl; and p is 1 to 6 (in certain embodiments, p is at least 2).

As mentioned above, the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. The ring-opening reaction may be represented by the following Scheme I for reaction of a benzoxazine based on bisphenol A with a curative of formula $R^{10}—(ZH)_2$ to form a polymeric material:

Scheme I

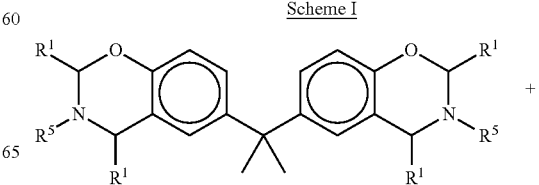

-continued $R^{30}(ZH)_2 \longrightarrow$

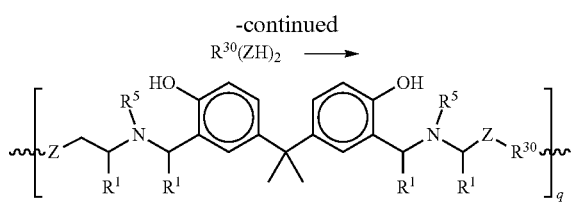

In Scheme I:

each $R^1$ is independently H or an alkyl group, and is the residue of an aliphatic aldehyde, Each $R^5$ is independently a (hetero)hydrocarbyl residue of a primary amino compound;

each $R^{30}$ is independently a (hetero)hydrocarbyl group;

Z is a —S— or —NR$^{11}$, wherein each $R^{11}$ is H or a hydrocarbyl group, including aryl and alkyl p is 1 to 6, or 2 to 6; and q is the number of repeat units and is at least 1 (in certain embodiments, q is at least 2).

Although the curative illustrated in Scheme 1 only has two —ZH groups, other curatives can have more than two —ZH groups. Thus, after reacting with two benzoxazine groups, such curatives can have additional —ZH groups available for further reactions with additional benzoxazine groups. Further, in embodiments where the starting benzoxazine was prepared with a polyamine, $R^5$ groups may be connected to additional benzoxazine groups. Note further that as the composition comprises at least one polyfunctional thiol compound or amine compound, polymeric reaction products result.

In these embodiments there is an excess of benzoxazine, as an unreacted benzoxazine will homopolymerize in the presence of the catalyst to form a coextensive mixture or polymer network of benzoxazine adducts with the curative of Formula (XII) and poly(benzoxazines). In such embodiments, the molar amounts ratio of benzoxazine groups to the sum of amine and/or thiol "Z" groups from the compound $R^{10}$—$(ZH)_p$, is 3:1 to 100:1, or in certain embodiments 4:1 to 50:1.

With reference to the curative of Formula (XII), $R^{30}$ $(ZH)_P$, the benzoxazine ring may be ring-opened by an amine compound. Useful amine compounds correspond to primary and secondary amines of the formula:

$R^{30}(NHR^{11})_p$ (XIII)

wherein, in Formula (XIII), $R^{30}$, $R^{11}$, and p are as defined above for Formula (XII). Such compounds include primary and secondary (hetero)hydrocarbyl monoamines and polyamines. In the compounds of Formula (VIII), the $R^{10}$ may be (hetero)hydrocarbyl group that has a valence of p, and is the residue of a mono-, di- or higher amine having at least one primary amine group. The $R^{30}$ can be an alkyl, a cycloalkyl or aryl, and p is 1 to 4, or 2 to 4. In certain embodiments, the $R^{30}$ is selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen). Each $R^1$ is independently H or a hydrocarbyl group, including aryl and alkyl, and p is 1 to 6, or 2 to 6. It will be clear to one skilled in the art that the same amines used in the preparation of the benzoxazines will also be useful in the ring-opening reaction.

The benzoxazine ring may also be opened with thiols of the formula:

$R^{30}$—$(SH)_p$ (XIV)

wherein, in Formula (XIV), $R^{30}$ and p are as defined above for Formula (XII). That is, in the compounds of Formula (XIV), p is 1 to 6, or 2 to 6, and $R^{30}$ includes a (hetero) hydrocarbyl group, including aliphatic and aromatic monothiols and polythiols. $R^{30}$ may optionally further include one or more functional groups including hydroxyl, acid, ester, cyano, urea, urethane and ether groups.

In some preferred embodiments, the thiol compounds of Formula (XIV) are of the formula:

$R^{32}$—$[(CO_2)_x$—$R^{33}$—$SH]_y$ (XV)

wherein in Formula (XV):

$R^{32}$ is an alkylene group, an aryl group, an oxyalkylene group, or combination thereof; $R^{33}$ is a divalent hydrocarbyl group;

x is 0 or 1; and y is 1 to 6, preferably 2 to 6.

In certain embodiments, the compounds of Formulas (XV) to are those in which $R^{32}$ is an alkylene group.

Useful alkyl thiols include methyl, ethyl and butyl thiol. Other useful thiols include 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, mercaptoalkanoic acids and esters thereof including mercaptoproionic acid, 2-chloroethanethiol, 2-amino-3-mercaptopropionic acid, dodecyl mercaptan, thiophenol, 2-mercaptoethyl ether, and pentaerythritol tetrathioglycolate. Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or β-mercaptopropionic acid or esters thereof. Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate) pentaerythritol tetrakis(3-mercaptopropionate), all of which are commercially available. A specific example of a polymeric polythiol is polypropylene ether glycol bis(3-mercaptopropionate) which is prepared from polypropylene-ether glycol (e.g., that available under the trade name PLURAXOL P201 from BASF Wyandotte Chemical Corp.) and 3-mercaptopropionic acid by esterification.

In some embodiments, useful thiols include those thiols derived from epoxy compounds. The polythiol may be derived from the reaction between $H_2S$ (or equivalent) and an epoxy resin having two or more functional groups and preferably having a molecular weight of less than 1000. For example, bifunctional epoxy resins, such as a bisphenol A epoxy resin and a bisphenol F epoxy resin, and novolak epoxy resins, such as a phenolic novolak epoxy resin and a cresol novolak epoxy resin, or amine epoxy resins, can be used. In addition, generally known polyfunctional epoxy resins, heterocycle-containing epoxy resins, and alicyclic epoxy resins can be used. These epoxy resins may be used alone or in combinations of two or more chemical types or molecular weight ranges.

A particularly useful polythiol is that derived from bisphenol-A diglycidyl ether, available as QX-11 from Japan Epoxy Resins, having a thiol equivalent weight of approximately 245 and the following general structure, where n is at least 1:

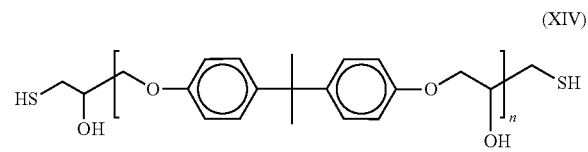

(XIV)

Useful soluble, high molecular weight thiols include polyethylene glycol di(2-mercaptoacetate), and those resins available under the trade names LP-3 (supplied by LP North America, Houston, Tex.) and PERMAPOL P3 (supplied by Products Research & Chemical Corp., Glendale, Calif.), and compounds such as the adduct of 2-mercaptoethylamine and caprolactam.

The compounds of Scheme I may be prepared by combining the benzoxazine compounds with a curative either neat or in a suitable solvent. Suitable solvents include those in which the reactants dissolve, preferably at room temperature, and that are non-reactive with the various components in the polymerizable composition. Examples of suitable solvents include butyl acetate, toluene, xylene, tetrahydrofuran, ethylene glycol dimethyl ether and the like. Heating is generally unnecessary as the thiol and amine-induced ring opening is exothermic.

Combinations of various curatives can be used if desired.

If used, a curative is present in an amount of at least 5%, and often as much as 60% of the benzoxazine equivalent.

Film-Forming Materials

Polymerizable compositions of the present disclosure may include a film-forming material, which can be in the form of monomers, oligomers, polymerizable pre-polymers, polymers, or a combination thereof. These materials, as the name suggests, enable the formation of benzoxazine-containing films that reduce the brittleness of typical benzoxazines. Such films are typically flexible and tacky over a desired temperature window in the sub-ambient to benzoxazine-cure temperature range. The film-former may be reactive or nonreactive with the benzoxazine, or any other components such as the catalyst, co-catalyst, curative, toughener, and the like.

In some embodiments the film-formers are materials, particularly oligomers or polymers, which form a homogenous mixture with the benzoxazine/catalyst mixtures at processing temperatures, preferably from sub-ambient to the processing of the polymerizable benzoxazine composition. Catalyst present in these films provides for excellent shelf life even when the films are stored at elevated temperatures.

Optionally, film formers can have reactive functional groups that react with a portion of the benzoxazine. The film-forming material may include a reactive film-forming material that includes one or more functional groups reactive with the benzoxazine, such as those selected from the group of a thiol, an amine, a benzoxazine, a formaldehyde, an aldehyde, and a combination thereof. The reactive film-forming material may include a compound that can react with, and be bonded to, the benzoxazine. The presence of one or more functional groups can afford increased processability options for said films: they can be processed above or below the reaction temperature of the reactive group to afford variable degree of tack, flexibility, and other desirable properties. Examples of such reactive film formers include, but are not limited to, amine-terminated butadiene-nitrile (ATBN), hydroxy-terminated butadiene-nitrile (HOTBN), carboxy-terminated butadiene-nitrile CTBN, amine-terminated poly(alkylene oxides) (such as those available under the trade names JEFFAMINE and VERSALINK) and related compounds.

In some embodiment the reactive film-formers may have different reactive groups in the backbone and termini. Examples of such materials include the end-functional butadiene-nitrile rubbers such as ATBN, which has unsaturation in its repeat unit and amine functional reactive groups on its ends. The amine functional groups may react with the benzoxazine by nucleophilic ring-opening (e.g., as described herein with respect to the curatives), and the unsaturation may react with the catalyst by vulcanization.

Examples of suitable nonreactive film-forming polymers for coating formulations include acrylic polymers (e.g., poly(methyl methacrylate-co-ethyl acrylate) and poly(methyl acrylate-co-acrylic acid)); polyurethanes (e.g., reaction products of aliphatic, cycloaliphatic or aromatic diisocyanates with polyester glycols or polyether glycols); polyolefins; polystyrene; copolymers of styrene with acrylate(s) (e.g., poly(styrene-co-butyl acrylate); polyesters, (e.g., polyethylene terephthalate, polyethylene terephthalate isophthalate, and polycaprolactone); polyamides, (e.g., polyhexamethylene adipamide); vinyl polymers, (e.g., poly(vinyl acetate/methyl acrylate) and poly(vinylidene chloride/vinyl acetate); polydienes, (e.g., poly(butadiene/styrene)); cellulosic polymer including cellulose ethers and cellulose esters, (e.g., ethyl cellulose and cellulose acetate/butyrate); polyimides; polysulfones; urethane-acrylate copolymers; and polyethers. Such polymers are available, for example, from commercial sources or may be prepared using methods and starting materials known in the art.

Combinations of various film-forming materials may be used if desired.

If used, film-forming material is present in an amount of at least 10 wt-%, and in certain embodiments, at least 25 wt-%, based on the total weight of the polymerizable composition. If used, film-forming material is present in an amount of no greater than 75 wt-%, and in certain embodiments, no greater than 50 wt-%, based on the total weight of the polymerizable composition.

Other Optional Additives

Certain other optional additives may also be included, including, for example, tougheners, epoxy resin, and other reactive diluents. Such additives provide various functions (e.g., film formation). For example, a toughening agent may reduce brittleness and/or add strength to the composition after curing without interfering with curing. An epoxy resin may reduce the viscosity, lower Tg, and/or function as a carrier for a toughening agent.

It will be understood by one of skill in the art that one compound may form two or more different functions. For example, a compound may function as both a toughening agent and a curative.

In some embodiments, such additives will not react with the benzoxazine. In some embodiments, such additives may include reactive functional groups, particularly as end groups.

Examples of such reactive functional groups include, but are not limited to, amines, thiols, alcohols, epoxides, vinyls, and combinations thereof. Toughening agents are useful in polymerizable compositions of the present disclosure are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski). Exemplary rubbery backbones include polymerized butadiene or a polymerized mixture of butadiene and styrene. Exemplary shells including polymerized methacrylic acid esters are lower alkyl (C1-C4)substituted methacrylates. Exemplary monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below 0° C., such as polybutyl acrylate or polyisooctyl acrylate to which is grafted a polymethacrylate polymer (shell) having a glass transition above 25° C., such as polymethylmethacrylate.

The third class of toughening agents useful in the invention includes elastomeric particles that have a glass transition temperature ($T_g$) below 25° C. before mixing with the other components of the composition. These elastomeric particles are polymerized from free radical polymerizable monomers and a copolymerizable polymeric stabilizer that is soluble in the benzoxazine. The free radical polymerizable monomers are ethylenically unsaturated monomers or diisocyanates combined with co-reactive difunctional hydrogen compounds such as diols, diamines, and alkanolamines.

Useful toughening agents include core/shell polymers, such as methacrylate-butadiene-styrene (MBS) copolymer wherein the core is crosslinked styrene/butadiene rubber and the shell is polymethylacrylate (for example, those available under the trade names ACRYLOID KM653 and KM680, from Rohm and Haas, Philadelphia, Pa.), those having a core including polybutadiene and a shell including poly(methyl methacrylate) (for example, those available under the trade names KANE ACE M511, M521, B11A, B22, B31, and M901 from Kaneka Corporation, Houston, Tex. and CLEARSTRENGTH C223 from ATOFINA, Philadelphia, Pa.), those having a polysiloxane core and a polyacrylate shell (for example, those available under the trade names CLEARSTRENGTH S-2001 from ATOFINA and GENIOPERL P22 from Wacker-Chemie GmbH, Wacker Silicones, Munich, Germany), those having a polyacrylate core and a poly(methyl methacrylate) shell (for example, those available under the trade names PARALOID EXL2330 from Rohm and Haas and STAPHYLOID AC3355 and AC3395 from Takeda Chemical Company, Osaka, Japan), those having an MBS core and a poly(methyl methacrylate) shell (for example, those available under the trade names PARALOID EXL2691A, EXL2691, and EXL2655 from Rohm and Haas); and the like; and mixtures thereof.

As used above, for acrylic core/shell materials "core" will be understood to be an acrylic polymer having a $T_g$ of less than 0° C. and "shell" will be understood to be an acrylic polymer having a $T_g$ of greater than 25° C.

Other useful toughening agents include: carboxylated and amine terminated acrylonitrile/butadiene vulcanizable elastomer precursors, such as those available under the trade names HYCAR CTBN 1300X8, ATBN 1300X16, and HYCAR 1072 from B. F. Goodrich Chemical Co.; butadiene polymers, such as those available under the trade name HYCAR CTB; amine functional polyethers such as HCl 101 (i.e., polytetramethylene oxide diamine) a 10,000 MW, primary amine-terminated, compound from 3M Co., St. Paul, Minn., and those available under the trade name JEFFAMINE from Huntsman Chemical Co., Houston, Tex.; functional acrylic rubbers including acrylic core/shell materials, such as those available under the trade names ACRYLOID KM330 and 334 from Rohm & Haas; and core/shell polymers, such as methacrylate-butadiene-styrene (MBS) copolymer wherein the core is crosslinked styrene/butadiene rubber and the shell is polymethylacrylate (e.g., that available under the trade names ACRYLOID KM653 and KM680; Rohm and Haas). Useful liquid poly-butadiene hydroxyl terminated resins include those available under the trade names LIQUIFLEX H by Petroflex of Wilmington, Del., and HT 45 by Sartomer of Exton, PN.

Tougheners may include epoxy-terminated compounds, which can be incorporated into the polymer backbone. A typical, preferred, list of tougheners includes: acrylic core/shell polymers; styrene-butadiene/methacrylate core/shell polymers; polyether polymers; carboxylated acrylonitrile/butadienes; and carboxylated butadienes. Advantages can be obtained from the provision of the chain extension agent in a composition with an epoxy resin even in the absence of a toughening agent as described above. However, particular advantage is achieved from the presence of the toughening agent or combinations of different agents, as previously suggested.

It will be appreciated that some of the described natural and synthetic rubbers will have unsaturation in the chain that can be crosslinked by the catalyst. Thus, the catalyst will polymerize the benzoxazine, and concurrently vulcanize the rubber to for a co-extensive network of poly(benzoxazine) and vulcanized rubber.

Various combinations of toughening agents can be used if desired.

If used, a toughening agent is present in a polymerizable composition in an amount of at least 3 wt-%, or at least 5 wt-%, based on the weight of the benzoxazine. If used, a toughening agent is present in a polymerizable composition in an amount of no greater than 35 wt-%, or no greater than 25 wt-%, based on the weight of the benzoxazine.

Other optional additives include epoxy resins. Such materials may function as a curative, a reactive diluent, or a co-reactant. The epoxy group does not react directly with the benzoxazine as do the amines or thiols of the curatives, but the phenolic group resulting from the ring opening of the benzoxazine may further react to ring-open the epoxy groups.

Polyepoxy compounds which can be utilized in the compositions of the disclosure include both aliphatic and aromatic polyepoxides. In certain embodiments, glycidyl aliphatic epoxides are preferred. The aromatic polyepoxides are compounds containing at least one aromatic ring structure, e.g., a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the disclosure include 3',4'-epoxycyclohexylmethyl-3,4-epoxycyclohexanecarboxylate, 3,4-epoxycyclohexyloxirane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof. Preferred such polyepoxides do not include cycloaliphatic groups.

Representative examples of aromatic polyepoxides, which can be utilized in the composition of the disclosure, include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxy)phenylpropane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,31-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schroeder) and U.S. Pat. No. 3,298,998 (McConnell et al.), as well as the derivatives described in the Handbook of Epoxy Resins by Lee and Neville, McGraw-Hill Book Co., New York (1967), and mixtures thereof.

An exemplary class of polyepoxy compounds is polyglycidyl ethers of polyhydric alcohol, particularly polyphenols. The glycidyl epoxy compounds are generally more reactive toward amines than cycloaliphatic epoxy compounds. In some embodiments, the epoxy compound generally has an epoxy equivalent weight (EW) of 170 to 4,000, or 170 to 1,000. The epoxide equivalent weight (EW) is defined as the weight in grams of the epoxy functional compound that contains one gram equivalent of epoxy (oxirane) functional groups.

If used, an epoxy resin is present in a polymerizable composition in an amount of at least 5 wt-%, or at least 3 wt-%, based on the weight of the benzoxazine. If used, a toughening agent is useful in a polymerizable composition in an amount of no greater than 35-wt-%, or no greater than 25 wt-%, based on the weight of the benzoxazine.

Other optional additives, or adjuvants, may be added to the compositions as desired. Examples of such other optional additives include as colorants, abrasive granules, anti-oxidant stabilizers, thermal degradation stabilizers, light stabilizers, conductive particles, tackifiers, flow agents, bodying agents, flatting agents, inert fillers, binders, blowing agents, fungicides, bactericides, surfactants, plasticizers, rubber tougheners, and other additives known to those skilled in the art. Such additives are typically substantially unreactive, such as fillers, both inorganic and organic. These adjuvants, if present, or other optional additives, are added in an amount effective for their intended purpose.

The choice and amounts of optional components depend on the needs of the specific application. For example, for a structural/semi-structural benzoxazine adhesive, the polymerizable composition could contain silica fillers, glass bubbles, and tougheners. These adjuvants add toughness to and reduce the density of the polymerized composition. For a protective coating, such as an abrasion resistant coating, which is generally hard, requires a significant portion of the formulation to be a hard resin that includes generally short chain lengths and high functionality. Coatings undergoing some flex require toughness which can be obtained by using the above-mentioned additive to increase toughness and increase flexibility. Clear coatings require the cured resins to have little to no phase separation. This is obtained by controlling the compatibility of the resins or controlling phase separation by cure rate.

Reaction conditions for curing the composition depend on the reactants and amounts used and can be determined by those skilled in the art. The curable compositions are made by mixing in any order the benzoxazine compound and the alkylating agent described above. Generally, the composition is then heated to a temperature between about 50 and 200° C., preferably between about 130-180° C., for a time of about 1-120 minutes.

Suitable sources of heat to cure the compositions of the invention include induction heating coils, ovens, hot plates, heat guns, infrared sources including lasers, microwave sources. Suitable sources of light and radiation include ultraviolet light sources, visible light sources, and electron beam sources.

Solvents can be used to assist in dissolution of the alkylating agent in the benzoxazine monomers, and also as a processing aid. It may be advantageous to prepare a concentrated solution of the alkylating agent in a small amount of solvent to simplify the preparation of the polymerizable composition. Useful solvents are lactones, such as gamma-butyrolactone, gamma-valerolactone; and epsilon-caprolactone; ketones such as acetone, methyl ethyl ketone, methyl isobutyl ketone, cyclopentanone and cyclohexanone; sulfones, such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methylsulfonyl)ethanol, 2,2'-sulfonyldiethanol; sulfoxides, such as dimethyl sulfoxide; cyclic carbonates such as propylene carbonate, ethylene carbonate and vinylene carbonate; carboxylic acid esters such as ethyl acetate, methyl cellosolve acetate, methyl formate; and other solvents such as methylene chloride, nitromethane, acetonitrile, glycol sulfite and 1,2-dimethoxyethane (glyme).

Compositions of this invention are useful for coatings, foams, shaped articles, adhesives (including structural and semistructural adhesives), magnetic media, filled or reinforced composites, coated abrasives, caulking and sealing compounds, casting and molding compounds, potting and encapsulating compounds, impregnating and coating compounds, conductive adhesives for electronics, protective coatings for electronics, and other applications that are known to those skilled in the art. When uncured or partially cured, the benzoxazine compositions exhibit pressure-sensitive adhesive properties, including tack. In some embodiments, the present disclosure provides a coated article comprising a substrate, having a cured coating of the benzoxazine thereon.

To prepare a structural/semi-structural benzoxazine adhesive, the curable composition could contain additional adjuvants such as silica fillers, glass bubbles and tougheners. These adjuvants add toughness to and reduce the density of the cured composition.

To prepare protective coatings, the choice of materials depends on the needs of the specific application. Abrasion resistant coatings are generally hard and require a significant portion of the formulation to be a hard resin, which are generally short chain length and have high functionality. Coatings undergoing some flex require toughness which can be obtained by lowering the crosslink density of the cure formulation. Clear coatings require the cured resins to have little to no phase separation. This is obtained by controlling the compatibility of the resins or controlling phase separation by cure rate. Adjuvants could be added to these coating formulations in an amount effective for their intended use.

The composition may be coated onto substrates at useful thicknesses ranging from 25-500 micrometers or more. Coating can be accomplished by any conventional means such as roller, dip, knife, or extrusion coating. Solutions of the curable composition may be used to facilitate coating. Stable thicknesses are necessary to maintain the desired coating thickness prior to crosslinking of the composition to form the crosslinked composition.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl (meth)acrylate), polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood and composites of the foregoing materials.

The instant disclosure further provides a pressure-sensitive adhesive which comprises a coating of the uncured or partially cured benzoxazine composition on a suitable substrate, such as an adhesive tape backing. A preferred method of preparing a pressure-sensitive adhesive article comprises partially curing the novel composition to a useful coating viscosity, coating the partially crosslinked composition onto a substrate (such as a tape backing) and further curing the composition. Useful coating viscosities are generally in the range of 500 to 10,000 cps.

Procedures and Test Methods

Except where specified to the contrary, amounts are given in equivalents (eq). Equivalents are based on the moles of reactive groups per mole of reactant molecule. Hence, 2 equivalents of a bifunctional reactant represents one mole of that reactant, and one mole of a trifunctional reactant would represent 3 eq of that reactant. Catalysts are treated as if monofunctional.

Differential Scanning Calorimetry (DSC) was performed on an aliquot of a given reaction mixture which was placed into an open aluminum DSC pan and heated at 10° C./min from 25° C. to 300° C. in a Differential Scanning Calorimeter (Seiko Instruments USA, Inc., Torrance, Calif. or TA Instruments New Castle, Del.

Cohesive Strength was measured using the Overlap Shear Strength Test (OLS). Overlap, or "lap", shear specimens were made using 4 in×7 in×0.063 in (10 cm×18 cm×0.16 cm) 7075 T6 bare aluminum that had been anodized according to Boeing Aircraft Company Specification BAC-5555. The anodization voltage was 22.5 volts. The specimen was generated as described in ASTM Test Method D-1002. The specific thermal coating conditions varied, as described below in each Example. Generally, a strip of approximately 0.5 in (1.3 cm)×0.15 mm of adhesive was applied to one edge of each of the two adherends using a scraper. Three 75-micron diameter piano wires were used as spacers for bondline thickness control. The bond was closed and taped on the edge. The bond was placed between sheets of aluminum foil and pieces of cardboard. Two 14 lb (6.4 kg) steel plates were used to apply pressure to provide for adhesive spreading. After the adhesive had been allowed to cure (as described in each Example), the large specimen was cut into 1 in (2.5 cm) wide smaller specimens, providing a 0.5 in2 (3.2 cm2) bonded area. Six lap shear specimens were obtained from each larger specimen. The bonds were tested to failure at room temperature on a SINTECH Tensile Testing machine (MTS, Eden Prairie, Minn.), using a crosshead displacement rate of 0.1 in/min. The failure load was recorded. The lap width was measured with a vernier caliper. The quoted lap shear strengths are calculated as (2 times the failure load)/(measured width). The average (mean) and standard deviation were calculated from the results of six tests.

Floating Roller Peel Strength Test for Adhesive Film

Primed panels of 2024-T3 bare aluminum measuring 8 inches long times 3 inches wide times 0.063 inches thick (20.3 times 7.6 times 0.16 centimeters), and 10 inches long times 3 inches wide times 0.025 inches thick (25.4 times 7.6 times 0.064 centimeters), were prepared for testing as described elsewhere in "FPL Etched and Phosphoric Acid Anodized Aluminum Substrate". The primed panels were bonded together using the same film adhesive and cure cycle employed for the overlap shear samples, then evaluated for floating roller peel strength in accordance with ASTM D-3167-76 with the following modification. Test strips measuring 0.5 inch (12.7 cm) wide were cut along the lengthwise direction of the bonded aluminum panels. A tensile testing machine operated at a rate of 6 inches/minute (30.5 cm/minute) was used to peel the thinner substrate from the thicker one, and the results normalized to a width of one inch.

FPL Etched and Phosphoric Acid Anodized Aluminum Substrate

The aluminum substrates as described above were treated as follows before bonding: 1) soaking for 10 minutes in Oakite 165 caustic wash solution, available from Chemetall GmbH (Germany), at a temperature of 85° C.; 2) the sheets (in a rack) are submerged in tank of tap water for 10 minutes; 3) spray rinsing with tap water for 2-3 minutes; 4) soaking in a tank of FPL etch (a hot solution of sulfuric acid and sodium dichromate from Forest Products Laboratory of Madison, Wis.) at 66° C. for 10 minutes; 5) spray rinsing with tap water for 2-3 minutes; 6) drip drying for 10 minutes at ambient temperature and then for 30 minutes in a re-circulating air oven at 54° C.;

In all cases, the panels were further treated as follows. The etched panels were anodized by immersion in phosphoric acid at 22° C. with an applied voltage of 15 Volts for 20-25 minutes, followed by rinsing with tap water (test for water break), air drying for 10 minutes at room temperature, then oven drying in a forced air oven at 66° C. for 10 minutes. The resulting anodized aluminum panels were immediately primed within 24 hours of treatment. The anodized panels were primed with a corrosion inhibiting primer for aluminum (3M. Scotch-Weld™. Structural Adhesive Primer EW-5000, available from 3M, St. Paul, Minn.) according to the manufacturer's instructions to give a dried primer thickness of between 0.00010 and 0.00020 inches (2.6 to 5.2 micrometers).

Adhesive Sample Preparation for OLS and FRP

Preparation of Uncured, Nylon Matte-Supported Adhesive Films

A sample of a liner/adhesive/liner sandwich was laminated with a polyester nonwoven matte using heated two roller laminator. The liner from one side of the coated adhesive sandwich was removed and a supporting, nonwoven polyester matte, having an areal weight of 0.25 ounces/square yard (0.0085 kg/square meter), was placed onto the exposed adhesive surface. This matte was slightly larger in size than the sandwich. The liner was replaced over the nylon matte [Liner Available from Loparex, Iowa City, Iowa, Product #23210 (76#BL KFT H/HP 4D/6MH paper 42")] and this lay-up was passed between two rubber-coated, heated nip rollers at a temperature of approximately 140 F (60 C). The position of the upper roller and its contact pressure with the lower drive roller was controlled by air pressurized pistons having an air supply pressure of about 20 psi (137.9 kPa). An adhesive film having a nylon matte embedded therein and having a release liner on each side was obtained.

A scrim supported adhesive composition was laminated between FPL etched and anodized 2024 T3 aluminum coupons both 17.78 cm by 10.16 cm by 1.6 mm thick as follows: a 1.27 cm by 17.78 cm sample of adhesive was attached flush to the edge of both coupons so that the OLS construction was about 19.05 cm in length and cured in the autoclave as described elsewhere.

A scrim supported adhesive composition was laminated between FPL etched and anodized 2024 T3 aluminum coupons designated for FRP testing: a 3" by 10" sample of adhesive was sandwiched between two panels and cured in the autoclave as described elsewhere.

Floating Roller Peel Strength Test for Adhesive Film

Primed panels of 2024-T3 bare aluminum measuring 8 inches long times 3 inches wide times 0.063 inches thick (20.3 times 7.6 times 0.16 centimeters), and 10 inches long times 3 inches wide times 0.025 inches thick (25.4 times 7.6 times 0.064 centimeters), were prepared for testing as described elsewhere in "FPL Etched and Phosphoric Acid Anodized Aluminum Substrate". The primed panels were bonded together using the same film adhesive and cure cycle employed for the overlap shear samples, then evaluated for floating roller peel strength in accordance with ASTM D-3167-76 with the following modification. Test strips measuring 0.5 inch (12.7 cm) wide were cut along the lengthwise direction of the bonded aluminum panels. A tensile testing machine operated at a rate of 6 inches/minute (30.5 cm/minute) was used to peel the thinner substrate from the thicker one, and the results normalized to a width of one inch.

Overlap Shear Strength (OLS)

Cured joined structures were evaluated for overlap shear strength. More specifically, cured joined structures measuring 7 inches (17.8 centimeters) long were obtained which were then were sawn across their width into 1 inch (2.54 centimeters) wide (nominal) test strips. This single overlap shear test strip was then positioned in a tensile tester (available from MTS Systems Corporation, Eden Prairie, Minn.) such that the gripping jaws were approximately 5 inches (12.7 centimeters) apart and each jaw gripped approximately 1 inch (2.5 centimeters) of the test strip. A 30,000 pound/force ($lb_f$) (13.3 kiloNewtons) load cell was employed. A grip separation rate of 0.05 inches/minute (1.27 millimeters/minute) was applied until failure occurred. Testing was conducted at one of two different test temperatures (24° C. or 136° C.), as determined by means of a thermocouple attached to the test strip. Samples were equilibrated at temperature for between 10 and 20 minutes (inclusive) prior to testing. For each cured joined structure six test strips were evaluated and used to obtain an average value. The results are reported in pounds/square inch (psi).

FPL Etched and Phosphoric Acid Anodized Aluminum Substrate

The aluminum substrates as described above were treated as follows before bonding: 1) soaking for 10 minutes in Oakite 165 caustic wash solution, available from Chemetall GmbH (Germany), at a temperature of 85° C.; 2) the sheets (in a rack) are submerged in tank of tap water for 10 minutes; 3) spray rinsing with tap water for 2-3 minutes; 4) soaking in a tank of FPL etch (a hot solution of sulfuric acid and sodium dichromate from Forest Products Laboratory of Madison, Wis.) at 66° C. for 10 minutes; 5) spray rinsing with tap water for 2-3 minutes; 6) drip drying for 10 minutes at ambient temperature and then for 30 minutes in a re-circulating air oven at 54° C.;

In all cases, the panels were further treated as follows. The etched panels were anodized by immersion in phosphoric acid at 22° C. with an applied voltage of 15 Volts for 20-25 minutes, followed by rinsing with tap water (test for water break), air drying for 10 minutes at room temperature, then oven drying in a forced air oven at 66° C. for 10 minutes. The resulting anodized aluminum panels were immediately primed within 24 hours of treatment. The anodized panels were primed with a corrosion inhibiting primer for aluminum (3M. Scotch-Weld™ Structural Adhesive Primer EW-5000, available from 3M, St. Paul, Minn.) according to the manufacturer's instructions to give a dried primer thickness of between 0.00010 and 0.00020 inches (2.6 to 5.2 micrometers).

DMA Sample Preparation

Compositions from the Examples 25, 26, and 37-40 were cast into a silicone mold, sandwiched between two silicone release liner coated PET sheets. Said mold consisted of ca. 1.5 mm thick sheet with rectangular cutouts (approximately 5 mm wide×30 mm long) to prepare samples for the dynamic mechanical analysis.

The assembly was then clamped between two glass plates and allowed to cure at 100° C. for 60 minutes, followed by an additional 60 minutes at 180° C. The clamped assembly was then allowed to cool to room temperature, and the samples were then removed and run in Seiko DMS-200 dynamic mechanical analyzer in tensile mode heated at 2° C./minute in the temperature range between −80° C. and 320° C. The cured samples were translucent, lemon-yellow in color. The traces of the loss tangent of those DMA scans appear in the Figures above.

Autoclave Curing:

OLS and FRP layups were placed in a vacuum bag which was then positioned in an autoclave. A partial vacuum of about 30-32 inches Hg was applied at room temperature (approximately 72° F. (22° C.)) for 10 to 15 minutes after which the external pressure was gradually increased to 45 psi (310 kPa). The vacuum bag was then vented to release the vacuum, and the temperature was raised at 5° F./minute (2.8° C./minute) up to 350° F. (177° C.) and held there for 1 hours. The cured bonded article were then cooled at 10° F./minute (5.5° C./minute) to room temperature, at which point the pressure was released, and the cured articles were removed from the autoclave and vacuum bag.

Materials and Abbreviations Employed

BZ-1 Araldite™ MX 35600 benzoxazine available from Huntsman, Tex.

BZ-2 p-cresol benzoxazine, prepared as described in Preparative Example 48 p-cresol is available from Aldrich, Milwaukee, Wis.

ethyl tosylate is available from Aldrich, Milwaukee, Wis.

4-hydroxybenzyl alcohol is available from Aldrich, Milwaukee, Wis.

chloroform is available from Aldrich, Milwaukee, Wis.

methylene chloride is available from Aldrich, Milwaukee, Wis.

aniline is available from Aldrich, Milwaukee, Wis.

paraformaldehyde is available from Aldrich, Milwaukee, Wis.
methyl lactate is available from Aldrich, Milwaukee, Wis.
triethyl amine is available from Aldrich, Milwaukee, Wis.
tosyl chloride is available from Aldrich, Milwaukee, Wis.
DMAP (4-dimethylaminopyridine) is available from Aldrich, Milwaukee, Wis.

Preparative Example 1: Synthesis of Lactate Tosylate

To 5.2 grams (0.05 mol) methyl lactate (Aldrich) were added 5.06 grams (0.05 mol) triethyl amine (Aldrich) and the mixture was dissolved in ca. 50 ml methylene chloride at room temperature. To it were added 9.5 g (0.05 mol) tosyl chloride and 100 mg of DMAP. The solution was allowed to stir at room temperature overnight. White precipitate began forming virtually immediately. Precipitate was filtered (6.6 grams, corresponding to 0.048 mol triethyl ammonium hydrochloride) and the solution was evaporated under reduced pressure at 30° C. to remove the solvent, yielding 9.6 of the desired product, confirmed by $^1$H and $^{13}$C NMR.

Preparative Example 2: Synthesis of Benzyl Lactic Amide Tosylate 5.2 grams (0.05 mol) methyl lactate were heated to 85 C with the equimolar amount (5.35 grams) of benzyl amine overnight and evaporated under reduced pressure at 90° C. the next morning to yield ca. 8.9 grams (quantitative) of the desired benzyl amide of the lactic acid, confirmed by $^1$H and $^{13}$C NMR.

Benzyl amide of the lactic acid thus produced was tosylated using the same procedure as in Example 1 to yield the desired benzyl lactic amide tosylate in nearly quantitative yields.

Preparative Example 3: Synthesis of Acetoin Tosylate [ref. 10]

A mixture of 2.39 grams (0.03 mol) of Cu(II)O [Aldrich, 79.55 g/m] and 11.41 grams (0.06 mol) toluene sulfonic acid [Aldrich, 190.22 g/m] were heated to reflux in 800 ml of acetonitrile for 1 hour until clear tourmaline green solution was obtained. To that, 1.44 grams (0.02 mol) methyl ethyl ketone (MEK) were added and refluxed overnight. The solution was then evaporated under reduced pressure to strip off the solvent and produce pale greenish-grey sediment. It was taken in 200 ml CH$_2$Cl$_2$ and washed with equal volume of water twice. The organic phase (1.35 grams, 0.006 m) [242.29 g/m], Y=28% of the clean desired product, confirmed by $^1$H and $^{13}$C NMR.

Preparative Example 4: Synthesis of (R)-2-(methoxycarbonyl)propyl tosylate (R)-2-(methoxycarbonyl)propyl tosylate was prepared from the parent alcohol using the preparative procedure of Example 1: 5.2 grams (0.05 mol) methyl-2(R)hydroxypropionate were added to 5.06 g (0.05 mol) triethyl amine to which 9.6 g (0.05 mol) of tosyl chloride and 100 mg of DMAP were added in ca. 100 ml CH$_2$Cl$_2$. The solution was stirred overnight as white precipitate began forming almost immediately. The precipitate was collected (nearly quantitative @6.5 g) and the organic layer was washed with 50 of v. dilute HCl. And the solvent removed @30 C rotovap, yielding 10.3 grams product, confirmed by $^1$H and $^{13}$C NMR, Y-80%.

Preparative Example 5: Synthesis of (S)-2-(methoxycarbonyl)propyl tosylate (S)-2-(methoxycarbonyl)propyl tosylate was prepared from the parent alcohol using the preparative procedure of Example 4: 5.2 grams (0.05 mol) methyl-2(S)hydroxypropionate were added to 5.06 g (0.05 mol) triethyl amine to which 9.6 g (0.05 mol) of tosyl chloride and 100 mg of DMAP were added in ca. 100 ml CH$_2$Cl$_2$. The solution was stirred overnight as white precipitate began forming almost immediately. The precipitate was collected (nearly quantitative @6.5 g) and the organic layer was washed with 50 of v. dilute HCl. And the solvent removed @30 C rotovap, yielding 10.3 grams product, confirmed by $^1$H and $^{13}$C NMR, Y-80%.

Preparative Example 6: Synthesis of Phenylethyl Tosylate 6.1 grams (0.05 mol) phenylethanol were added to 5.1 g (0.05 mol) triethyl amine and dissolved in ca. 100 ml THF. To the solution were added 9.5 g (0.05 mol) tosyl chloride, 100 mg of DMAP and refluxed for 2 days. The product was decanted into 10% solution of HCl (conc. dil 10:1) in water and the organic phase (top) was evaporated under reduced pressure to produce 9.75 grams (Y=71%) of the desired product, confirmed by $^1$H and $^{13}$C NMR.

Preparative Example 7: Synthesis of 2-methyl-1-phenylpropan-2-yl benzoate 11.3 g (0.05 mol) of benzoic anhydride was added to a solution of 7.6 grams 0.05 mol. α,α dimethyl phenyethyl alcohol in 10.1 grams (0.1 mol) triethyl amine and 50 ml THF. The solution was refluxed overnight and then taken up in 10% HCl/aqueous solution. The organic phase was then washed by 0.15 mol NaOH (6 g) dissolved in 100 ml water to yield 11.5 grams (Y=90%), the desired amber liquid product, confirmed by $^1$H and $^{13}$C NMR.

Preparative Example 8: Synthesis of poly(acryloyl-4-oxybutyl-tosylate)

To 9.5 g (0.05 mol) of tosyl chloride were added 5.05 grams (0.05 mol) of triethyl amine, 100 mg of DMAP and 7.21 grams (0.05 mol) of 4-hydroxy-n-butyl acrylate. The mixture was dissolved in 50 ml CH$_2$Cl$_2$ and allowed to stir overnight at room temperature. Precipitate was filtered to reveal nearly quantitative yield (6.7 grams, corresponding to 0.049 mol triethyl ammonium hydrochloride) and the solution was evaporated under reduced pressure at 30° C. to remove the solvent, yielding 13.2 grams (0.044 mol; corresponding to Y=88%) of the desired monomer product, confirmed by $^1$H and $^{13}$C NMR.

Into 1 gram of the acryloyl-4-oxybutyl-tosylate monomer were dissolved 10 mg of KB-1 photoinitiator (2,2-dimethoxy-2-phenyl-1-phenylethanone, available as Esacure™ KB-1 photoinitiator Sartomer Co.; West Chester, Pa.). The solution was knife coated between two silicone coated PET release liners to 10 mil (250 micron) thickness and placed under UV lights for 10 minutes, during which the desired polymer (tacky, opalescent—colorless to white) was produced.

Preparative Example 9: Synthesis of poly(acryloyl-4-oxypropyl-tosylate)

To 9.5 g (0.05 mol) of tosyl chloride were added 7.25 grams (0.075 mol) of triethyl amine, 100 mg of DMAP and 6.5 grams (0.05 mol) of hydroxypropyl acrylate. The mixture was dissolved in 50 ml $CH_2Cl_2$ and allowed to stir overnight at room temperature. Precipitate was filtered to reveal yield (4.7 grams, corresponding to 0.034 mol triethyl ammonium hydrochloride) and the solution was washed with dilute HCl and the organic layer then evaporated under reduced pressure at 30° C. to remove the solvent, yielding 8.5 grams (0.03 mol; corresponding to Y=60%) of the desired monomer product, confirmed by $^1H$ and $^{13}C$ NMR.

Into 1 gram of the acryloyl-oxypropyl-tosylate monomer were dissolved 10 mg of KB-1 photoinitiator. The solution was knife coated between two silicone coated PET release liners to 10 mil (250 micron) thickness and placed under UV lights for 10 minutes, during which the desired polymer (tacky, opalescent—colorless to white) was produced.

Comparative Example 10: BZ-1 Catalysis Using Cyclohexyl Tosylate 5 wt % catalyst in benzoxazine mixture was prepared by admixing 50 mg of cyclohexyl tosylate powder with 1 gram of BZ-1. The powder was then vigorously shaken for 1 minute in a mechanical mixer. Two aliquots of between 4 and 6 mg were taken for differential scanning calorimetric analysis: the first was heated at a rate of 10° C./minute; the second at 3° C./minute. (This preparative procedure applies to all solid catalysts). The results are summarized in FIG. 1, and in Tables 1 and 2, below.

Comparative Example 11: BZ-1 Catalysis Using Methyl Tosylate 5 wt % catalyst in benzoxazine mixture was prepared by heating 1 gram of BZ-1 to 100° C. in an aluminum pan and admixing 50 mg of methyl tosylate into the molten benzoxazine while it cooled by vigorously stirring the mixture. Upon reaching room temperature, the solidified mass was ground to a fine powder with an agate mortar and pestle. The powder was then vigorously shaken for 1 minute in a mechanical mixer. Two aliquots of between 4 and 6 mg were taken for differential scanning calorimetric analysis: the first was heated at a rate of 10° C./minute; the second at 3° C./minute. (This preparative procedure applies to all liquid catalysts) The results are summarized in FIG. 1, and in Tables 1 and 2, below.

Comparative Example 12: BZ-1 Catalysis Using Ethyl Tosylate

The same procedure as in the Comparative Example 2 was used to prepare ethyl tosylate catalyzed BZ-1 compositions. The results are summarized in FIG. 1, and in Tables 1 and 2, below.

Examples 13-18, Comparative Examples 21-22 and Examples 23-28

The procedure from the Comparative Example 11 was employed to prepare 5% solid solutions of corresponding tosylates (Examples 13-18, Comparative Examples 21-22 and Examples 23-28) for the DSC (differential scanning calorimetry) experiments listed in Tables 1 and 2. The preparative synthetic details for these catalysts are reported in the Preparative Examples section of the present disclosure.

Examples 19 and 29 and Comparative Example 20

The procedure from the Comparative Example 10 was employed to prepare 5% solid solutions of corresponding catalysts in BZ-1 for the DSC experiments listed in Tables 1 and 2.

FIG. 1, below, contrasts the typical cure exotherm shapes obtained in DSC experiments using the catalysts of the present invention versus the much broader polymerization exotherms obtained using the catalysts of Comparative Examples as taught by the prior art.

The benzoxazine cure curves when the methyl, ethyl or cyclohexyl tosylates from the Comparative Examples are employed are characterized by their broadness, spanning 130° C. or wider. The width of the exotherm on a DSC curve is defined as the absolute of the difference between the temperatures at the base of the peak at either side of it, where the curve first begins to deviate from the baseline to where it returns to the baseline. The width at the half-height of the peak is yet another measure of the breadth of the exotherm. The values of the half-height widths for the methyl, ethyl and cyclohexyl tosylates obtained using 10° C./min heating rate are 76° C., 42° C. and 52° C. (Table 2), respectively, indicating very broad cures. Narrow values are preferred for both, the baseline and half-height widths as they indicate sharp cure profile. It is furthermore notable that the methyl tosylate catalyzed polymerization of benzoxazine has no thermal latency and starts immediately, greatly hindering processing.

When the DSC cure profiles are obtained for the same compositions using 3° C./minute heating rate (FIG. 1, below), the broadness of the cure exotherms become even more pronounced as shown in Table 1, below.

TABLE 1

CE10-13 vs EXAMPLES 1-9, DSC Heating Rate = 3° C./min

| EX # | Catalyst 5 wt % in BZ-1 | Structure | Onset (° C.) | Peak (° C.) | Exotherm (J/g) | Width (° C.) | Width @ ½ hgt (° C.) |
|---|---|---|---|---|---|---|---|
| CE-10 | Cyclohexyl Tosylate | | 148 | 187 | 290 | 123 | 61 |

TABLE 1-continued

CE10-13 vs EXAMPLES 1-9, DSC Heating Rate = 3° C./min

| EX # | Catalyst 5 wt % in BZ-1 | Structure | Onset (° C.) | Peak (° C.) | Exotherm (J/g) | Width (° C.) | Width @ ½ hgt (° C.) |
|---|---|---|---|---|---|---|---|
| CE-11 | Methyl Tosylate | | 106 | 163 | 167 | 235 | 77 |
| CE-12 | Ethyl Tosylate | | 144 | 165 | 230 | 128 | 60 |
| EX-13 | Methyl Lactate Tosylate | | 178 | 192 | 266 | 85 | 16 |
| EX-14 | Benzyl Lactic Amide Tosylate | | 174 | 189 | 248 | 91 | 18 |
| EX-15 | Acetoin Tosylate | | 171 | 187 | 279 | 104 | 34 |
| EX-16 | Methyl-2(R)-tosyl propionate | | 177 | 193 | 280 | 102 | 25 |
| EX-17 | Methyl-2(S)-tosyl propionate | | 170 | 190 | 280 | 103 | 30 |
| EX-18 | Phenylethyl Tosylate | | 176 | 189 | 260 | 93 | 17 |
| EX-19 | Diethylene glycol Ditosylate | | 156 | 176 | 260 | 107 | 28 |

TABLE 2

CE1-3 vs EXAMPLES 1-9, DSC Heating Rate = 10° C./min

| EX # | Catalyst 5 wt % in BZ-1 | Structure | Onset (° C.) | Peak (° C.) | Exotherm (J/g) | Width (° C.) | Width @ ½ hgt (° C.) |
|---|---|---|---|---|---|---|---|
| CE-20 | Cyclohexyl Tosylate | 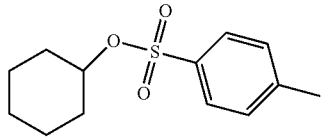 [SMILES: Cc1ccc(S(=O)(=O)OC2CCCCC2)cc1] | 165 | 208 | 310 | 128 | 52 |
| CE-21 | Methyl Tosylate | 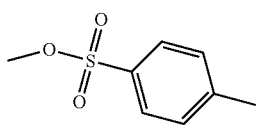 | 115 | 178 | 237 | 233 | 76 |
| CE-22 | Ethyl Tosylate | 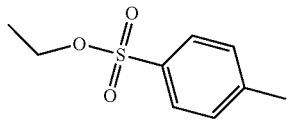 | 172 | 187 | 371 | 130 | 42 |
| EX-23 | Methyl Lactate Tosylate | 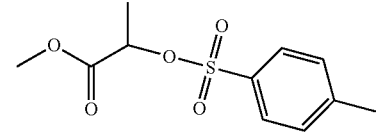 | 199 | 214 | 277 | 100 | 16 |
| EX-24 | Benzyl Lactic Amide Tosylate | 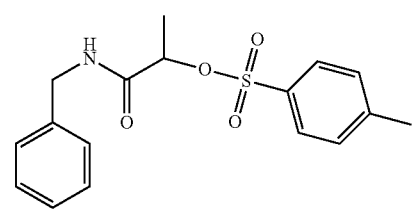 [SMILES: Cc1ccc(S(=O)(=O)OC(C)C(=O)NCc2ccccc2)cc1] | 196 | 211 | 278 | 98 | 16 |
| EX-25 | Acetoin Tosylate | 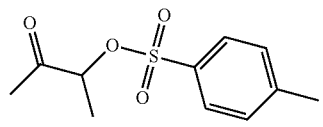 [SMILES: CC(=O)C(C)OS(=O)(=O)c1ccc(C)cc1] | 190 | 206 | 322 | 106 | 19 |
| EX-26 | Methyl-2(R)-tosyl propionate | 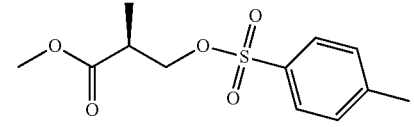 | 198 | 215 | 290 | 98 | 20 |
| EX-27 | Methyl-2(S)-tosyl propionate | 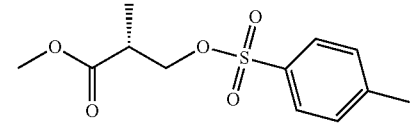 | 191 | 211 | 279 | 106 | 25 |
| EX-28 | Phenylethyl Tosylate | 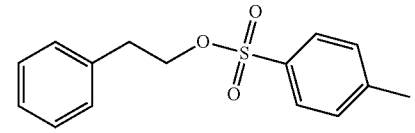 [SMILES: Cc1ccc(S(=O)(=O)OCCc2ccccc2)cc1] | 198 | 212 | 278 | 101 | 16 |
| EX-29 | Diethylene glycol Ditosylate | 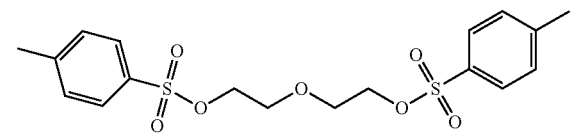 | 178 | 198 | 253 | 107 | 25 |

Several observations are immediate from the two Tables:
- At 10° C./min heating rate, the alkylating agents of the Comparative Examples have a much broader exotherm (130° C. to 230° C. wide; 42° C. to 76° C. wide at peak half-height) than the compounds of the present invention (~100° C. wide, 16° C. to 25° C. wide at peak half-height);
- Similar trend is observed at 3° C./min heating rates: 125° C. to 235° C. full peak width and 60° C. to 77° C. at peak half-height for the Comparative Examples versus 85° C. to 107° C. full peak width and 16° C. to 35° C. at peak half-height for the disclosed compounds.
- At 10° C./min heating rate, two of the alkylating agents of the Comparative Examples (ethyl and cyclohexyl tosylates) have a usefully low onset at ca. 165° C., with the peaks at 187° C. and 208° C., respectively, versus higher onsets in the 190's ° C. and comparable peaks in the 206° C. to 215° C. for the disclosed inventions.
- Notable exception is the DEG ditosylate with a comparable onset of 178° C. and lower peak of 198° C.
- Same trend is observed at 3° C./min heating rates, where the same ethyl and cyclohexyl tosylates of the CE have onsets in 140's ° C. with the peaks at 165° C. and 187° C., respectively; whereas the subjects of the present invention have onsets in the 170's ° C. and peaks similarly, mostly in the 180's to low 190's ° C.
- The notable exception is DEG bis-tosylate there as well, with a lower than CE peak at 176° C. accompanied by a sharp onset at 156° C.
- Overall, all of the objects of the present invention display much more useful and sharper cure profile than those tosylates previously disclosed in the art.

Comparative Example 30

The sample for the Comparative Example 30 was prepared employing an identical procedure to CE-10, except 10 wt % (200 mg) of cyclohexyl tosylate catalyst in 1.8 grams of BZ-1 were used. The mixture, shaken inside a sealed glass vial in a mechanical mixer for 1 minute was placed in a 140° C. oven for 30 minutes. The sample was then allowed to cool and extracted from the vial.

The orange colored sample was marked with numerous voids and pits as to render its appearance foamy. The voided and foamy appearance of the sample is consistent with the weight loss and NMR data indicating loss of cyclohexene byproduct of the catalyst thermolysis.

Example 31

The sample of Example 32 was prepared by admixing 10 wt % (200 mg) of methyl lactate tosylate catalyst in 1.8 grams of BZ-1. The mixture was stirred into a uniform mass for 1 minute inside a glass, was then sealed and placed in a 140° C. oven for 30 minutes. The sample was then allowed to cool and extracted from the vial.

The surface of the orange sample, similar in color to that of CE-30, appeared smooth and clear and free of defects and voids that marked CE-30. Furthermore, because the sample was clear and translucent, no subsurface bubbles were observed in the bulk of the sample.

Comparative Example 32 and Example 33

Figure 2:
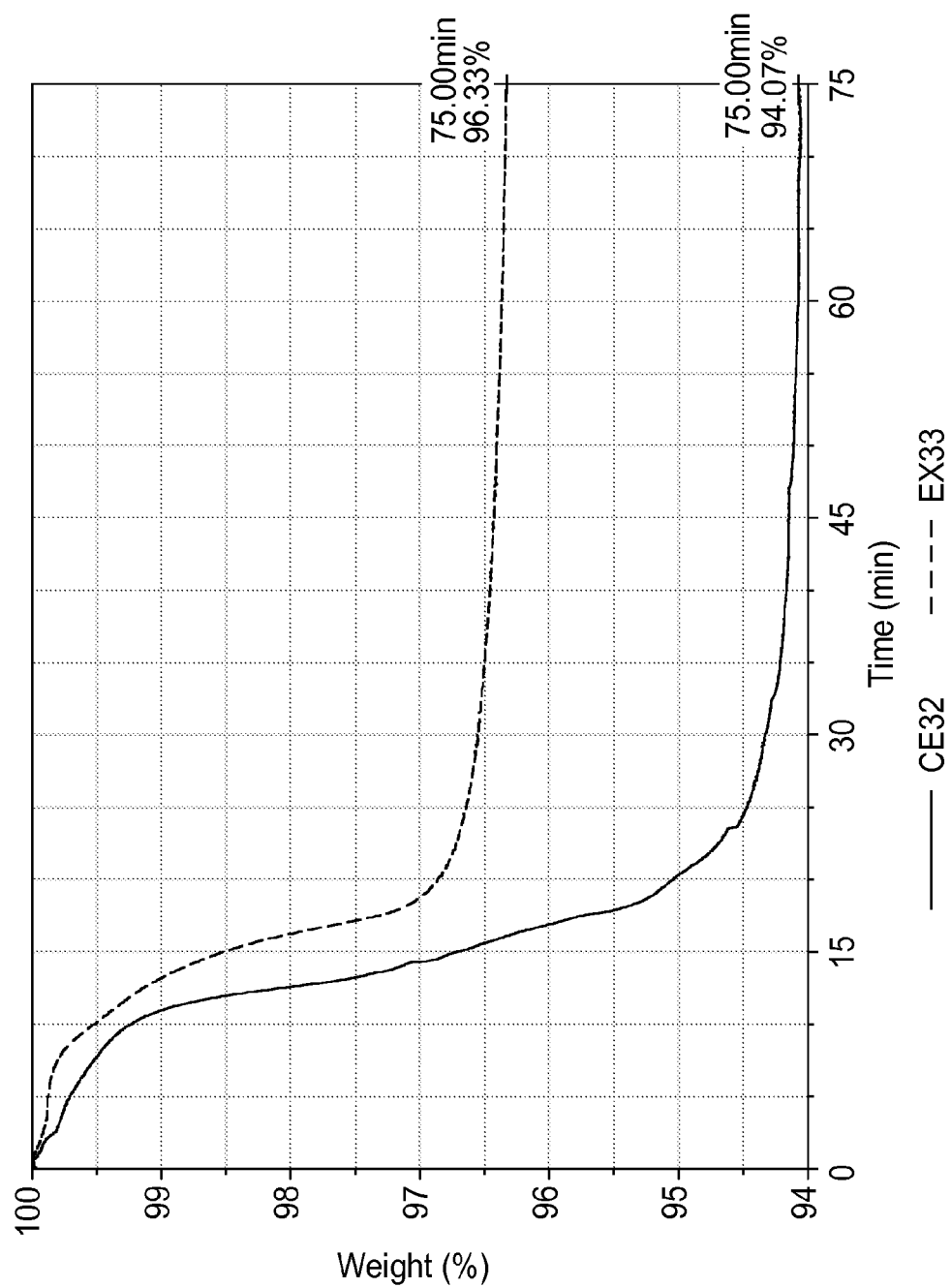
FIG. 2 is a DMA scan of Comparative Example 32, and Example 33.

Aliquot samples from the Comparative Example 10 and Example 19 (two samples used for reproducibility), above were analyzed using thermogravimetric analysis. The samples were heated at 10° C./minute to 200° C. and annealed at that temperature for 75 minutes. The resulting weight losses are recorded in Table 3 and are shown in FIG. 2:

TABLE 3

TGA Weight Loss Comparison at 200° C. of Cx-oTs v DEG-oTs catalyzed BZ-1

| CATALYST | EXAMPLE # | 200° C. for 75 min |
|---|---|---|
| Cyclohexyl Tosylate | CE-32 | 5.93 |
| Diethylene Glycol di-Tosylate | Ex-33 | 3.67 |

Comparative Example 34 and Example 35

Aliquot samples from the Comparative Example 10 and Example 19 (two samples used for reproducibility), above were analyzed using thermogravimetric analysis. The samples were heated at 10° C./minute to 150° C. and annealed at that temperature for 150 minutes. The resulting weight losses are recorded in Table 4.

TABLE 4

TGA Weight Loss Comparison at 200° C. of Cx-oTs v DEG-oTs catalyzed BZ-1

| CATALYST | EXAMPLE # | 150° C. for 150 min |
|---|---|---|
| Cyclohexyl Tosylate | CE-34 | 4.87 |
| Diethylene Glycol di-Tosylate | Ex-35 | 3.29 |

The data from Tables 3 and 4 and FIG. 2 are consistent with the visual observation of CE 30 and EX-31. Lower weight loss in Examples 33 and 35 vs in the corresponding Comparative Examples 32 and 34 are consistent with the void-free appearance of the EX-31 sample. The volatile residues that plague samples prepared using catalysts taught in the art are remedied by the present disclosure.

Comparative Example 36: Cyclohexyl Tosylate/BZ-2 Reaction

The sample for the Comparative Example 36 was prepared employing an identical procedure to CE-30, except BZ-2 benzoxazine was used. The mixture was placed in a 140° C. oven. Aliquots taken after 5 and 15 minutes 140° C. were cooled to room temperature. Each aliquot of the room temperature sample was then dissolved in deuterated dmso-d6 for nuclear magnetic resonance studies.

In both cases, the data are dominated by resonances that are consistent with tosylate anion, cyclohexene, polybenzoxazine, and some formaldehyde. These spectral assignments were confirmed using homo- and hetero-nuclear two dimensional (2D) NMR data.

The increasing amount of cylcohexene (singlet at 5.63 ppm in $^1$H spectra) as the reaction progresses is indicative of an protonation-initiated polymerization mechanism The protonation of the ring is evidenced by the accompanying elimination reaction to create the volatile vinyl (cyclohexene in this case) fragment. Equally notable is the absence in the spectra of the cyclohexyl phenyl ether resonances which would have provided evidence for alkylation of the benzoxazine ring by cyclohexyl tosylate. Instead, experimental evidence indicates the presences of only the species that are consistent with the protonation mechanism, followed by elimination to form the unsaturation in the resulting vinyl fragment.

Example 37 (Methyl Lactate Tosylate/BZ-2 Reaction)

The sample of Example 33 was prepared by was prepared employing an identical procedure to EX-31, except BZ-2 benzoxazine was used. The mixture was placed in a 130° C. oven. Room temperature aliquots of EX-37, sampled after 5, 10 and 15 minutes at 130 C were each dissolved in dmso-d6 and analyzed by nuclear magnetic resonance. 1H, 13 C, HSQC and HMBC NMR data were collected after that reaction time for the methyl lactate tosylate catalyzed samples of p-cresol benzoxazine sample.

NMR spectra evidence methyl lactate moiety of the parent methyl lactate tosylate bonding to the nitrogen of the benzoxazine.

In summary, the data are dominated by resonances that are consistent with polybenzoxazine, methyl lactate methyl lactate amine groups with the methyl lactate tosylate initiating benzoxazine polymerization by alkylating on the nitrogen of the benzoxazine, i.e.

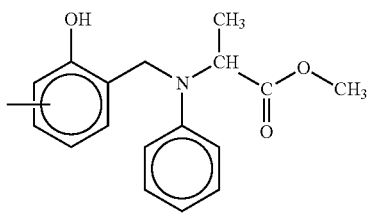

Methyl lactate alklylation of nitrogen adduct. The broadened peaks in the 1.33-1.37 ppm region are attributed to the methyl group most proximate to the nitrogen. Alkylation of nitrogen appears to initiate the bulk of benzoxazine polymerization

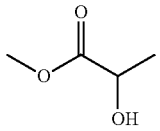

Methyl lactate. The sharp doublet at 1.58 and 1.59 ppm attributed to the methyl group adjacent to the hydroxyl.

and a minor amount of formaldehyde. The spectral assignments were confirmed using homo- and hetero-nuclear, two dimensional (2D) NMR data. There is little if any spectral evidence in either data set that is consistent with methyl acrylate monomer, oligomers, or polymer, indicating that the alkylation is the preferred route of benzoxazine initiation by methyl lactate tosylate.

Several other tosylate-catalyzed benzoxazine systems from Tables 1 and 2 have been similarly analyzed via nuclear magnetic resonance and 2D NMR. Specifically, NMR analysis of ethyl tosylate (CE-3), methyl lactate tosylate (EX-1a), methyl-2(R)tosyl propionate (EX-4) and diethylene glycol ditosylate (EX-7) systems all suggest that polybenzoxazine initiation takes place by alkylation of the nitrogen by the corresponding tosyl counterion.

Examples 38-39, Comparative Examples 40-43

A stock solution of 231 grams of ground BZ-1, 3 grams of fumed silica (Cabot TS-720) with 2 grams of elemental sulfur was prepared by heating up the mixture at 130° C. until molten. Six 23.1 gram portions of same were weighed out. To each, the appropriate amount (either 5 or 7 grams of 1300X16 ATBN pre-heated to 100° C. (an amine terminated butadiene-acrylonitrile copolymer Hycar), per Table 5 were added and mixed vigorously while cooling. Then, per Table 5, 1.15 grams of the appropriate tosylate were added and mixed vigorously.

The mixture, while still hot was coated hot between two silicone release-coated PET liners to a 250 micrometer-thick film using a knife coater set at 80° C. The film was subsequently used for the overlap shear (OLS) and floating roller peel (FRP) layups as described in Procedures and Test Methods Section, Section below.

TABLE 5

Composition of Comparative Examples 40-43, Examples 38-39

| Example Number | BZ-1 (g) | Sulfur (g) | Tosylate | ATBN-X16 (g) | wt % ATBN |
|---|---|---|---|---|---|
| CE-40 | 23.1 | 0.2 | none | 5 | 18 |
| CE-41 | 23.1 | 0.2 | none | 7 | 23 |
| CE-42 | 23.1 | 0.2 | cyclohexyl | 5 | 18 |
| CE-43 | 23.1 | 0.2 | cyclohexyl | 7 | 23 |
| EX-38 | 23.1 | 0.2 | methyl lactate | 5 | 18 |
| EX-39 | 23.1 | 0.2 | methyl lactate | 7 | 23 |

The shear values are listed in the Table 6, thermally annealed data are summarized in Table 7, and the fixed roller peel (FRP) data are in Table 8, below.

TABLE 6

Adhesive Testing Summaries of Tosylate/ATBN/BZ Compositions Shear (psi)

| Example # | Wt % ATBN | $OLS_{avg}$ @ 24° C. | $OLS_{avg}$ Test Temp @ 135 C. | $OLS_{avg}$ @ 177° C. |
|---|---|---|---|---|
| CE-40 | 18 | 1538 | Fail | 299 |
| CE-41 | 23 | 2472 | 591 | 360 |
| CE-42 | 18 | 1236 | 653 | 745 |
| CE-43 | 23 | 2163 | 567 | 798 |
| EX-38 | 18 | 2365 | 2014 | 1245 |
| EX-39 | 23 | 2457 | 2167 | 1412 |

TABLE 7

After 7 day 350° F. Anneal: Adhesive Testing Summaries of Blocked Acid/S-cured ATBN/BZ Compositions Shear (psi)

| Example # | Wt % ATBN | $OLS_{avg}$ @ 24° C. | $OLS_{avg}$ Test Temp @ 135 C. | $OLS_{avg}$ @ 177° C. |
|---|---|---|---|---|
| CE-40 | 18 | 2412 | 2452 | 952 |
| CE-41 | 23 | 2714 | 2089 | 1084 |
| CE-42 | 18 | 2254 | 1592 | 907 |
| CE-43 | 23 | — | 1557 | 1263 |
| EX-38 | 18 | 2381 | 2486 | 1451 |
| EX-39 | 23 | 2460 | 2347 | 1560 |

TABLE 8

Adhesive Testing Summaries of Tosylate/ATBN/BZ Compositions FRP

| Example # | Wt % ATBN | Peel$_{avg}$ |
|---|---|---|
| CE-40 | 18 | 23.8 |
| CE-41 | 23 | 25.3 |
| CE-42 | 18 | 24.5 |
| CE-43 | 23 | 24.2 |
| EX-38 | 18 | 20.5 |
| EX-39 | 23 | 21.0 |

These adhesive data illustrate that the use of blocked tosylates enables lower temperature cure of benxozazine films at 150 C. Furthermore the films thus obtained show markedly improved overlap shear adhesion and peel adhesion. Their thermal stability improves remarkably (data pending), as does their adhesion to aluminum at elevated temperatures (135 C and 177 C, both).

Examples 44-45; CE46-47

2.31 grams (0.01 mol) of finely ground BZ-1 powder were thoroughly admixed with the 5 wt % of the total (curative+BZ-1) composition per Table 9, below, and the corresponding curative was then added and admixed in the amounts in accordance to Table 9. A 3 mg to 10 mg sized aliquot of each mixture was heated at 10° C./min in a differential scanning calorimeter. The spectra of those heating experiments appear in FIGS. 14 and 15 below.

TABLE 10

| Example Number | BZ-1 (g) [0.01 mol] | Curative [0.01 mol] | Grams Curative | DEG*oTs |
|---|---|---|---|---|
| CE-46 | 2.31 | TMMP | 1.33 | 0 |
| EX-44 | 2.31 | TMMP | 1.33 | 0.182 |
| CE-47 | 2.31 | MXDA | 0.34 | 0 |
| EX-45 | 2.31 | MXDA | 0.34 | 0.133 |

Figure 3:
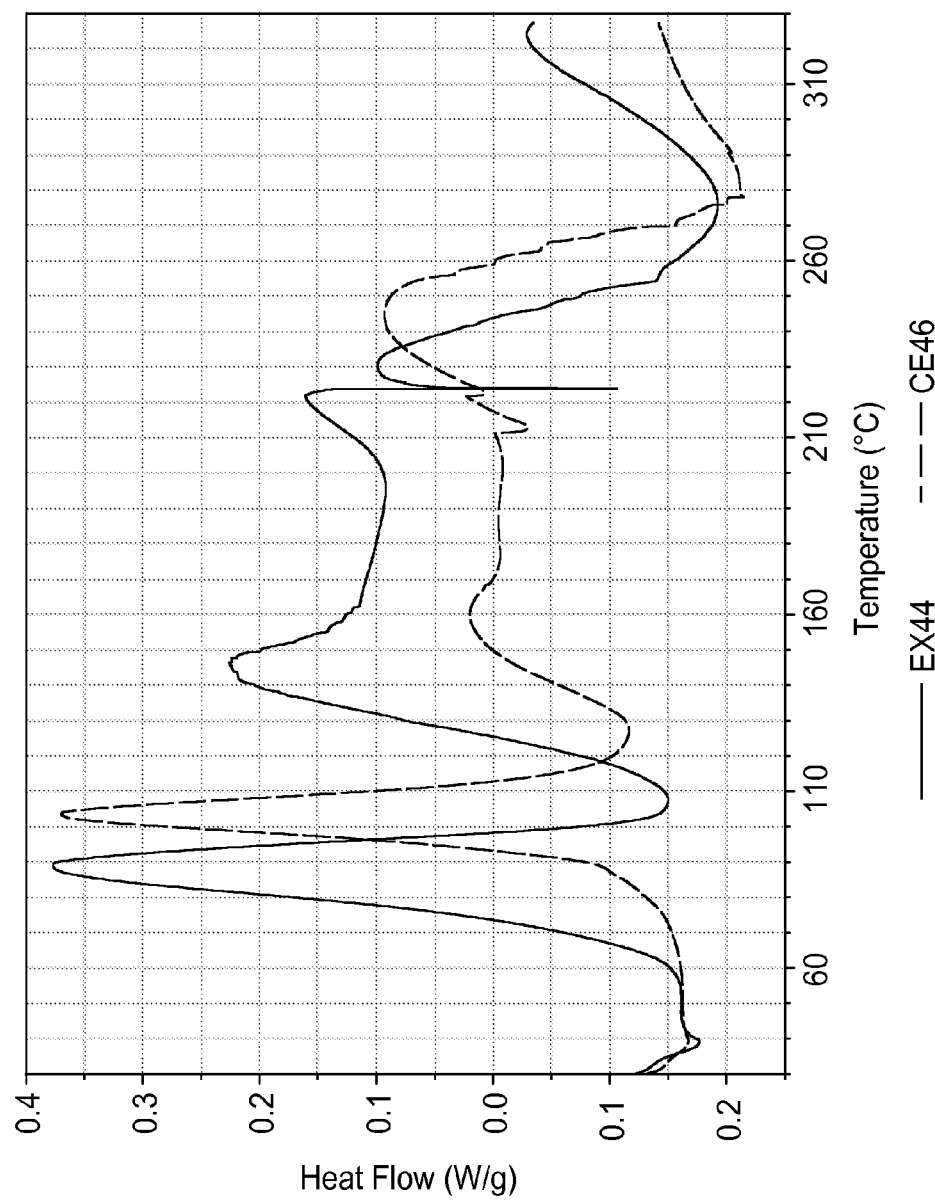
FIG. 3 is a DMA scan of Comparative Example 46, and Example 44.
Figure 4:
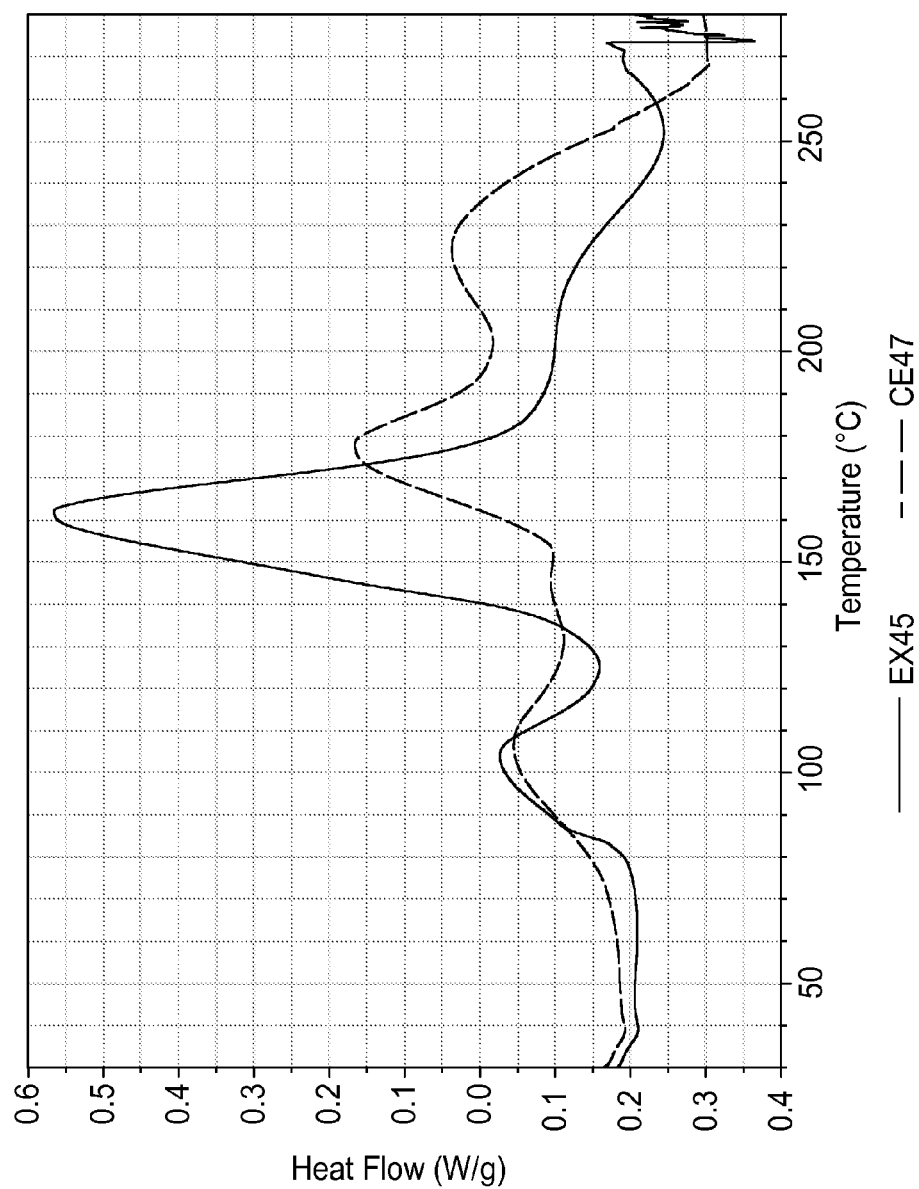
FIG. 4 is a DMA scan of Comparative Example 47, and Example 45.

FIG. 3 depicts the effect of the addition of blocked acids of the present invention to the amine-cured benzoxazine compositions. Most notably, the peak of the low temperature exotherm corresponding to the primary amine reaction with the benzoxazine shifts from 103° C. to 89° C. when the blocked acid is present. That result is consistent with the previously observed acid-aided amine cure of benzoxazines and hints at such amine-blocked acid interaction. Secondly, the broad higher temperature exotherm attributable to the secondary amine reaction with benzoxazine similarly shifts ~14° C. to lower temperature with the addition of the diethyelen glycol ditosylate. Lastly, both exotherms appear to be larger, indicating a fuller, more complete cure with the addition of the blocked acid.

The lower temperature cure exotherm, attributable to the thiol ring opening of benzoxazine (known as the COLBERT reaction) does not shift appreciably. In fact, it does become more pronounced with a more distinct onset and completion when the tosylate is present. The higher temperature peak, ascribed to the benzoxazine homopolymerization in that system, changes dramatically when the tosylate is introduced. The benzoxazine homopolymerization becomes significantly sharper and shifts to lower temperatures when the tosylate is present.

The difference between the impact of the tosylate on the amine vs thiol cure of the benzoxazine can be rationalized by the very different nature of the two reactions. Furthermore, there is a lesser chance of chemical interaction between the thiol and the blocked acid, as both are acidic species. In case of amine cure, amine can perhaps aid in liberating or unblocking the toluene sulfonic acid from the parent tosylate.

Preparative Example 48: Synthesis of p-Cresol Benzoxazine [BZ-2]

Para-cresol benzoxazine was prepared using conventionally employed procedures. To wit, 10.8 grams (0.1 mol) p-cresol was added to 200 ml of chloroform solution of 9.31 grams (0.1 mol) aniline and 6 grams (0.2 mol) of paraformaldehyde under reflux. The solution was refluxed for 18 hours, allowed to cool to room temperature, at which time the organic phase was collected from the aqueous (formed during the ring closure). The desired product was isolated under reduced pressure from the organic phase at essentially a quantitative yields. Product structure and purity were confirmed via $^1$H and $^{13}$C NMR.

The invention claimed is:

1. A polymerizable composition comprising:
   a) a benzoxazine, and
   b) a sulfonate compound of the formula:

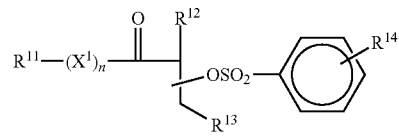

V wherein
$R^{11}$ is an alkyl or aryl or combination thereof;
$X^1$ is —O— or —NR$^{15}$— where $R^{15}$ is H or $C_1$-$C_4$ alkyl
n is 0 or 1;
$R^{12}$ is H or an alkyl;
$R^{13}$ is H or an alkyl;
$R^{14}$ is H or an alkyl.

2. The polymerizable composition of claim 1 wherein said sulfonate compound is of the formula:

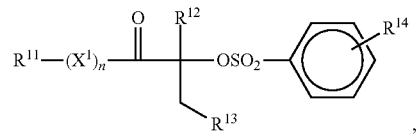

wherein
$R^{11}$ is an alkyl or aryl or combination thereof;
$X^1$ is —O— or —NR$^{15}$— where $R^{15}$ is H or $C_1$-$C_4$ alkyl
n is 0 or 1;
$R^{12}$ is H or an alkyl;
$R^{13}$ is H or an alkyl;
$R^{14}$ is H or an alkyl.

3. The polymerizable composition of claim 1 wherein said sulfonate compound is of the formula:

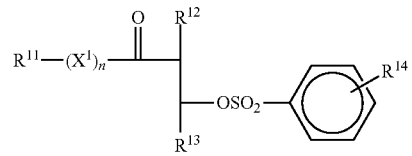

wherein

R$^{11}$ is an alkyl or aryl or combination thereof;

X$^1$ is —O— or —NR$^{15}$— where R$^{15}$ is H or C$_1$-C$_4$ alkyl n is 0 or 1;

R$^{12}$ is H or an alkyl;

R$^{13}$ is H or an alkyl;

R$^{14}$ is H or an alkyl.

4. The polymerizable composition of claim 1 comprising 0.05 to 10 parts by weight of said sulfonate compound relative to 100 parts by weight of said benzoxazine.

5. The polymerizable composition of claim 1 wherein said benzoxazine compound comprises at least one ring of the formula:

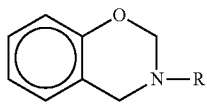

where R is an aryl group.

6. The polymerizable composition of claim 5 wherein said benzoxazine is of the formula:

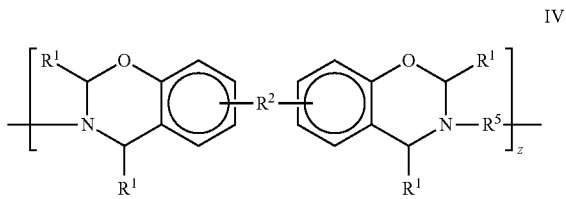

IV wherein each R$^1$ is H or an alkyl group, and is the residue of an aliphatic aldehyde, R$^2$ is, a covalent bond, or a polyvalent (hetero)hydrocarbyl group;

R$^5$ is the aryl residue of a primary amino compound;

z is at least 1.

7. The polymerizable composition of claim 5 where the benzoxazine is of the formula:

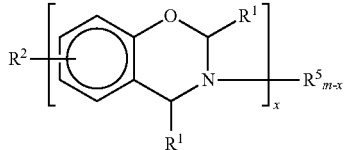

wherein each R$^1$ is H or an alkyl group, and is the residue of an aliphatic aldehyde, R$^2$ is H, a covalent bond, a phenol or a polyvalent (hetero)hydrocarbyl group;

R$^5$ is aryl residue of a primary amino compound, R$^5$(NH$_2$)$_m$, where R$^5$ is an aryl group, m is 1-4;

and x is at least 1.

8. The polymerizable composition of claim 1 further comprising a toughening agent.

9. The polymerizable composition of claim 8, wherein said toughening agent is present at between about 3% and 35% by weight of the benzoxazine.

10. The polymerizable composition of claim 1, further comprising a co-catalyst.

11. The polymerizable composition of claim 1 further comprising a curative, wherein the curative is selected from the group of a thiol compound, an amine compound, and a combination thereof.

12. A poly(benzoxazine) prepared from the polymerizable composition of claim 1 of the formula:

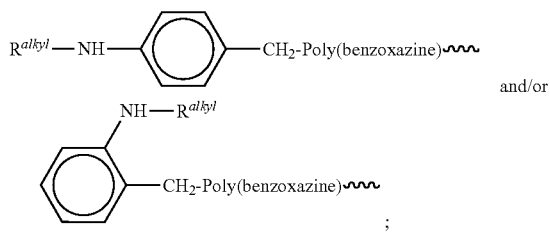

and/or wherein

R$^{alkyl}$ is the residue of the sulfonate compound; and

"Poly(benzoxazine)" comprises one or more of the following repeat units:

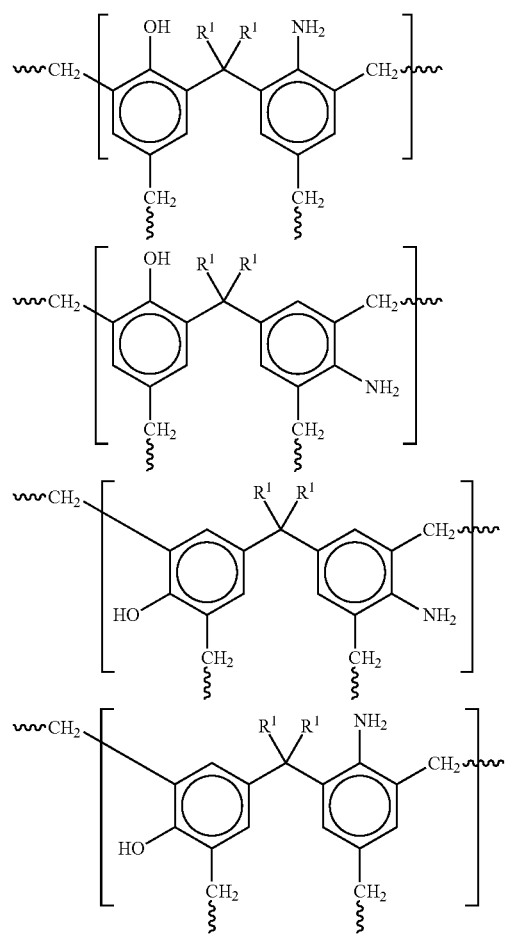

where each R$^1$ is independently H or an alkyl group, and

"~" represents attachment to another repeat unit.

13. An article comprising a substrate having a polymerized coating of the poly(benzoxazine) of claim 12 on a surface thereof.

* * * * *

UNITED STATES PATENT AND TRADEMARK OFFICE
CERTIFICATE OF CORRECTION

PATENT NO. : 9,896,599 B2
APPLICATION NO. : 14/776087
DATED : February 20, 2018
INVENTOR(S) : Ilya Gorodisher It is certified that error appears in the above-identified patent and that said Letters Patent is hereby corrected as shown below:

In the Specification

Column 5,
Line 4, delete "allyphenol;" and insert -- allylphenol; --, therefor.

Column 10,
Line 29, delete "NT;" and insert -- M; --, therefor.
Line 49, third occurrence, delete "eta$^6$" and insert -- eta$^5$ --, therefor.
Line 50, delete "eta5" and insert -- eta$^5$ --, therefor.
Line 50, delete "eta$^6$" and insert -- eta$^5$ --, therefor.
Line 52, delete "eta$^6$" and insert -- eta$^5$ --, therefor.
Line 53, delete "eta$^6$" and insert -- eta$^5$ --, therefor.
Line 57, delete "embodiments;" and insert -- embodiments, --, therefor.

Column 12,
Line 3, delete "SbF$_6$, PF$_6$)." and insert -- SbF$_6^-$, PF$_6^-$). --, therefor.

Column 22,
Line 7, delete "in2" and insert -- in 2 --, therefor.
Line 47, delete "C.;" and insert -- C. --, therefor.

Column 23,
Lines 9 & 10, delete "140 F (60 C)." and insert -- 140° F. (60° C.). --, therefor.

Column 24,
Line 10, delete "C.;" and insert -- C. --, therefor.
Line 59, after "48" insert -- . --.

Column 25,
Line 28, delete "85 C" and insert -- 85° C. --, therefor.

Signed and Sealed this
First Day of May, 2018

Andrei Iancu
*Director of the United States Patent and Trademark Office*

Column 26,
Line 37, delete "phenyethyl" and insert -- phenylethyl --, therefor.

Column 33,
Line 17, delete "190's ° C." and insert -- 190's° C. --, therefor.
Line 23, delete "140's ° C." and insert -- 140's° C. --, therefor.
Line 25, delete "170's ° C." and insert -- 170's° C. --, therefor.
Line 26, delete "190's ° C." and insert -- 190's° C. --, therefor.

Column 34,
Line 58, delete "cylcohexene" and insert -- cyclohexene --, therefor.

Column 35,
Line 11, delete "130 C" and insert -- 130° C. --, therefor.
Line 12, delete "13 C," and insert -- 13° C., --, therefor.

Column 36,
Line 44, delete "135 C." and insert -- 135° C. --, therefor.
Line 60, delete "135 C." and insert -- 135° C. --, therefor.

Column 37,
Line 13, delete "benxozazine" and insert -- benzoxazine --, therefor.
Line 14, delete "150 C." and insert -- 150° C. --, therefor.
Line 18, delete "(135 C" and insert -- (135° C. --, therefor.
Line 18, delete "177 C," and insert -- 177° C., --, therefor.
Line 51, delete "diethyelen" and insert -- diethylene --, therefor.